US012783497B2

(12) United States Patent

Weisman et al.

(10) Patent No.: US 12,783,497 B2
(45) Date of Patent: Nov. 3, 2026

(54) DATASET MULTIPLEXER FOR DATA PROCESSING SYSTEM

(71) Applicant: Ab Initio Technology LLC, Lexington, MA (US)

(72) Inventors: Amit Weisman, Bedford, MA (US); Cory Christopher James Fantasia, East Walpole, MA (US); Matthew Douglas Becker, Roslindale, MA (US); Ian Robert Schechter, Sharon, MA (US); Edward Alan Bach, Melrose, MA (US); Robert Parks, Weston, MA (US)

(73) Assignee: Ab Initio Technology LLC, Lexington, MA (US)

( * ) Notice: Subject to any disclaimer, the term of this patent is extended or adjusted under 35 U.S.C. 154(b) by 0 days.

(21) Appl. No.: 19/204,217

(22) Filed: May 9, 2025

(65) Prior Publication Data

US 2026/0030236 A1 Jan. 29, 2026

Related U.S. Application Data

(62) Division of application No. 17/588,965, filed on Jan. 31, 2022, now Pat. No. 12,339,829.

(Continued)

(51) Int. Cl.

*G06F 16/00* (2019.01)
*G06F 16/21* (2019.01)

(Continued)

(52) U.S. Cl.

CPC ........ *G06F 16/2365* (2019.01); *G06F 16/211* (2019.01); *G06F 16/2358* (2019.01); *G06F 16/258* (2019.01)

(58) Field of Classification Search

None

See application file for complete search history.

(56) References Cited

U.S. PATENT DOCUMENTS 5,511,177 A * 4/1996 Kagimasa ............ G06F 3/0601 711/170
5,734,887 A * 3/1998 Kingberg ............ G06F 16/284

(Continued)

FOREIGN PATENT DOCUMENTS

CN 103250145 A 8/2013
CN 105453021 A 3/2016

(Continued)

OTHER PUBLICATIONS

Chinese Office Action dated Jun. 7, 2025 in connection with Chinese Application No. 202280012645.X.

(Continued)

*Primary Examiner* — Jean M Corrielus

(74) *Attorney, Agent, or Firm* — Wolf, Greenfield & Sacks, P.C.

(57) ABSTRACT

A data processing system with a dataset multiplexer that enables applications to be written to specify access to datasets as operations on logical datasets. During execution of an application by the data processing system, operations that access a dataset are implemented by accessing an entry in a dataset catalog for the logical dataset. That entry includes information to access the physical data source storing the logical dataset, including conversion of data from the format of the physical data source to the format of the logical dataset. An entry in the catalog may be created based on registration of a data source with the dataset multiplexer and may be updated automatically based on changes in storage of the dataset. This maintenance of the catalog may be partially or totally automated such that the system auto- (Continued)

matically adjusts to any changes in storage of the dataset without need for modification of any application.

25 Claims, 16 Drawing Sheets

Related U.S. Application Data

(60) Provisional application No. 63/163,709, filed on Mar. 19, 2021, provisional application No. 63/143,898, filed on Jan. 31, 2021.

(51) Int. Cl.
*G06F 16/23* (2019.01)
*G06F 16/25* (2019.01)

(56) References Cited

U.S. PATENT DOCUMENTS 6,457,003 B1 * 9/2002 Gajda ..................... G06F 16/25
6,886,160 B1 * 4/2005 Lee ......................... H04L 67/06
717/173
7,827,201 B1 * 11/2010 Gordon ................. G06F 3/0667
707/821
8,412,746 B2 4/2013 Fox et al.
8,489,623 B2 * 7/2013 Jain ....................... G06F 40/205
707/755
9,317,538 B1 * 4/2016 Stephens ................. G06F 16/21
9,442,694 B1 * 9/2016 Boehme .................. G06F 11/00
9,977,659 B2 * 5/2018 Larson ...................... G06F 8/34
10,318,545 B1 6/2019 Klippsten et al.
10,713,272 B1 * 7/2020 Caldwell ............. G06F 16/2358
11,892,996 B1 2/2024 Anwar et al.
12,339,829 B2 6/2025 Weisman et al.
2004/0022097 A1 2/2004 Cho
2005/0033726 A1 2/2005 Wu et al.
2008/0270461 A1 * 10/2008 Gordon ................. G06F 3/0608
2010/0138388 A1 * 6/2010 Wakeling ................ G06F 16/25
715/764
2012/0102029 A1 * 4/2012 Larson ...................... G06F 8/34
707/736
2013/0097117 A1 * 4/2013 Lasky ................. G06F 11/1451
707/624
2015/0006580 A1 * 1/2015 Iakovlev ............. G06F 21/6281
707/783
2015/0356138 A1 * 12/2015 Anderson ............. G06F 9/5066
707/764
2016/0019057 A1 * 1/2016 Bach ......................... G06F 8/70
717/120
2016/0117362 A1 * 4/2016 Bagehorn ............. G06F 16/244
707/805
2016/0125057 A1 5/2016 Gould et al.
2017/0031967 A1 * 2/2017 Chavan ................... G06F 16/23
2019/0361910 A1 * 11/2019 Rogynskyy .......... G06Q 10/107
2022/0245125 A1 8/2022 Weisman et al.
2022/0245176 A1 8/2022 Weisman
2023/0359668 A1 11/2023 Schechter et al.
2025/0086175 A1 3/2025 Srinivasan et al.
2025/0181652 A1 6/2025 Weisman et al.

FOREIGN PATENT DOCUMENTS

JP H05-204729 A 8/1993
JP 2020-113210 A 7/2020

OTHER PUBLICATIONS

Japanese Office Action dated Nov. 4, 2025 in connection with Japanese Application No. 2023-546120.
Stockinger et al., Machmaking, Datasets and Physics Analysis. 2005 International Conference on Parallel Processing Workshops (ICPPW'05). Jun. 14, 2005. 8 pages. DOI:10.1109/ICPPW.2005.48. Retrieved from URL:https://ieeexplore.ieee.org/document/1488673 [accessed on Oct. 28, 2025].
Extended European Search Report dated Jan. 21, 2026 in connection with European Application No. 25221841.7.
First Examination Report dated Feb. 25, 2026 in connection with Indian Application No. 202327046272.

* cited by examiner

DATASET MULTIPLEXER FOR DATA PROCESSING SYSTEM

CROSS-REFERENCE TO RELATED APPLICATIONS

This application claims the benefit of priority under 35 U.S.C. 119(e) to U.S. Provisional Patent Application Ser. No.: 63/163,709, filed on Mar. 19, 2021, titled "DATASET MULTIPLEXER FOR DATA PROCESSING SYSTEM", and U.S. Provisional Patent Application Ser. No.: 63/143,898, filed on Jan. 31, 2021, titled "DATASET MULTIPLEXER FOR DATA PROCESSING SYSTEM," which are hereby incorporated by reference herein in their entirety.

FIELD

Aspects of the present disclosure relate to techniques for efficiently operating a data processing system with a large number of datasets that may be stored in any of a large number of data stores.

BACKGROUND

Modern data processing systems manage vast amounts of data within an enterprise. A large institution, for example, may have millions of datasets. This data can support multiple aspects of the operation of the enterprise such that having such a large number of datasets may be invaluable to the enterprise. Some datasets, for example, may support routine processes, such as tracking customer account balances or sending account statements to customers. In other instances, processing the data from one or more datasets may generate business insights, such as a conclusion that a requested transaction is fraudulent or that the enterprise is exposed to a particular level of financial risk as a result of transactions in the aggregate in a particular geographic region. In yet other instances, processing the data from one or more datasets may generate technical insights, such as a conclusion that the enterprise is exposed to a risk of technical failure as a result of an incorrect technical process.

Physical storage for these datasets may be provided in any of a number of ways. For example, a dataset might be stored in a structured way and managed by a database system within the enterprise. In this case, a dataset might be stored as one or more tables managed by the database. Alternatively, simple datasets might be stored in files that the data processing system can access, such as a .csv or .xml file or a flat file. The computer storage on which a dataset resides, whether as a file, a database table or in some other format, may be implemented physically in any of a number of forms, such as local to the data processing system, distributed throughout the enterprise or distributed throughout a network cloud managed by a third party.

An enterprise architect may select physical storage for a dataset based on anticipated characteristics of that dataset, such as size of the dataset, required access time, length of time the dataset is to be retained or impact to the enterprise as a result of loss or corruption of the dataset. Commercial considerations, such as price of storage or concerns about being locked into a third party storage vendor, may also impact choices made in implementing physical storage for an enterprise. As a result, data stores holding the datasets used within an enterprise may take any of multiple forms.

To support a wide range of functions, a data processing system may execute applications, whether to implement routine processes or to extract insights from the datasets. The applications may be programmed to access the data stores to read and write data.

SUMMARY

According to some aspects, a method, performed by a data processing system, enables efficient data analysis in a dynamic environment with multiple datasets by generating and/or using entries in a dataset catalog to enable access to physical datasets in data stores. The data processing system may be configured to execute data processing applications programmed to access logical datasets. Each logical dataset comprises a schema for data independent of a format of corresponding data in a physical dataset. The data processing system comprises a dataset multiplexer that is configurable to provide an application with access to the physical datasets in the data stores. The method comprises creating a plurality of entries in the dataset catalog, each of the plurality of entries being associated with a logical dataset and a physical dataset and having associated therewith computer-executable instructions for accessing the physical dataset; receiving input identifying, at least in part, a first logical dataset for accessing to perform an operation within a data processing application specifying access to a dataset; upon execution of the operation within the data processing application, invoking the computer-executable instructions for accessing a physical dataset associated with an entry in the dataset catalog associated with the first logical dataset; and dynamically updating entries in the dataset catalog in response to events indicating changes in physical datasets associated with logical datasets.

According to one aspect, creating a plurality of entries in the dataset catalog comprises receiving information relating to a first physical dataset of the physical datasets stored in a first data store of the data stores, wherein the first physical dataset corresponds to a first logical dataset; generating, based on the information relating to the first physical dataset, a first program comprising the computer-executable instructions for accessing the first physical dataset from the first data store; and storing, in a first entry in the dataset catalog, a link to the first program to enable the data processing application to access the first physical dataset with the first program.

According to one aspect, generating the first program for accessing the first physical dataset from the first data store comprises identifying a type of the first data store from the received information; selecting a first program template for the type of the first data store; and populating the first program template with one or more values for one or more parameters of the first program template to generate the first program.

According to one aspect, receiving input identifying, at least in part, a first logical dataset comprises providing a user interface through which a user identifies, at least in part, the first logical dataset.

According to one aspect, invoking the computer-executable instructions comprises enabling access to the entry, in the dataset catalog, associated with the first logical dataset; and enabling access, based on information within the entry, to a data store storing the physical dataset corresponding to the first logical dataset.

According to one aspect, dynamically updating entries in the dataset catalog comprises detecting an event indicating a change associated with a physical dataset corresponding to the first logical dataset; and based on the detection of the event, modifying the entry in the dataset catalog associated with the first logical dataset.

According to an aspect, modifying the entry in the dataset catalog comprises modifying the computer-executable instructions for accessing the physical dataset corresponding to the first logical dataset.

According to some aspects, a method, performed by a data processing system, for enabling efficient data analysis in a dynamic environment with multiple datasets by registering a dataset in a dataset catalog to facilitate access to a plurality of physical datasets in data stores is provided. The data processing system is operable with the plurality of physical datasets stored in the data stores. The data processing system comprises a dataset multiplexer that is configurable to provide an application with access to a physical dataset of the plurality of physical datasets, the physical dataset being stored in a data store of the data stores. The physical dataset corresponds to a logical dataset comprising a schema for data independent of a format of corresponding data in a physical dataset. The method comprises receiving information relating to a first physical dataset of the plurality of physical datasets stored in a first data store of the plurality of data stores, wherein the first physical dataset corresponds to a first logical dataset; generating, based on the information relating to the first physical dataset, a first program comprising computer-executable instructions for accessing the first physical dataset from the first data store; and storing, in a first object in a library of objects, a link to the first program to enable the application to access the first physical dataset with the first program.

According to one aspect, the method comprises based on detecting an event indicating a change associated with the first physical dataset, determining whether to modify the first program for accessing the first physical dataset.

According to one aspect, the method comprises based on determining to modify the first program: generating a modified first program; and replacing the first program with the modified first program as a target of the link.

According to one aspect, generating the modified first program comprises generating the modified first program without modifying the application or the first logical dataset.

According to one aspect, the information relating to the first physical dataset comprises information regarding a type of the first data store.

According to one aspect, the dataset multiplexer comprises the library of objects storing information for access to the plurality of physical datasets, and the first object in the library of objects comprises an identifier of the first physical dataset.

According to one aspect, the dataset multiplexer further comprises an API and the method further comprises providing the application access to the first object through the API.

According to one aspect, the method further comprises: assigning identifiers to objects in the library based on a schema and logical name of a respective logical dataset for which information is stored in the object.

According to one aspect, the method further comprises: receiving a command to register the first physical dataset in a dataset catalog; and based on the received command, generating and storing the first object in the library.

According to one aspect, the identifier of the first physical dataset is a physical identifier.

According to one aspect, the first object further comprises a second identifier, and the second identifier is a logical identifier of a logical dataset associated with the first object.

According to one aspect, the method further comprises: in response to detecting an event indicating that the first physical dataset has changed from being stored in the first data store to being stored in a second data store, modifying in the first object the physical identifier without modifying the logical identifier.

According to one aspect, the first object comprises values of parameters accessed in execution of the first program; and the method further comprises: based on detecting an event indicating a change to values of parameters accessed in the first program, modifying values of the parameters stored in the first object.

According to one aspect, the first program comprises access and conversion logic, and upon execution of the application, the access and conversion logic of the first program is executed to provide access to the first physical dataset and convert between a format used within the first physical dataset and a format used within the first logical dataset.

According to one aspect, the first program comprises one or more parameters impacting operation of the first program such that values of the one or more parameters impact access of the first physical dataset via the first program.

According to one aspect, the application is configured to supply a value of the one or more parameters for use in invoking the first program.

According to one aspect, the method further comprises generating the first program by: detecting a type of the first data store; and selecting a template from a plurality of templates based on the detected type.

According to one aspect, the first program comprises a first portion configured for read access to the first data store and a second portion for write access to the first data store.

According to one aspect, the first program is configured as an executable data flow graph comprising logic for accessing the first physical dataset.

According to some aspects, a method, performed by a data processing system, for enabling efficient data analysis in a dynamic environment with multiple datasets by using entries in a dataset catalog to enable an application to access a plurality of physical datasets in a plurality of data stores is provided. The data processing system is operable with the application and the plurality of physical datasets stored in the plurality of data stores. The application is programmed to access a logical dataset comprising a schema for data independent of the format of corresponding data in a physical dataset. The method comprises providing an user interface through which a user identifies, at least in part, a logical dataset for accessing in the application; executing the application and, upon execution of an operation involving access to the identified logical data set: enabling access to an object, in a library of objects, associated with the logical dataset; and enabling access, based on information within the object, to a data store storing the physical dataset corresponding to the identified logical dataset.

According to one aspect, the method further comprises: based on an event associated with the storage of data corresponding to the identified logical dataset, updating the information in the object.

According to one aspect, the information in the object comprises an executable program for accessing the physical dataset.

According to one aspect, the executable program for accessing the physical dataset encodes logic for converting data between a format used within the physical dataset and a format used within the logical dataset.

According to one aspect, the object is an executable program for accessing the physical dataset.

According to one aspect, the information in the object comprises a type of the data store.

According to one aspect, the information in the object comprises a record format or schema associated with the physical dataset.

According to one aspect, the information in the object comprises one or more parameters specifying the manner in which to access the physical dataset, the one or more parameters comprising at least one parameter indicating whether data in the physical dataset is compressed.

According to one aspect, the information in the object comprises one or more parameters specifying the manner in which to access the physical dataset, the one or more parameters comprising at least one parameter indicating a type of the access.

According to one aspect, the type of the access comprises an indication of a read access or a write access.

According to one aspect, the type of the access comprises an indication of access via a fast connection or a slow connection.

According to one aspect, the data processing system comprises a repository of metadata relating to logical datasets; and providing the user interface comprises presenting a menu of logical datasets based on metadata in the repository.

According to some aspects, a method, performed by a data processing system, enables efficient data analysis in a dynamic environment with multiple datasets by generating entries in a dataset catalog to enable access to physical datasets in data stores. The data processing system is configured to execute data processing applications programmed to access logical datasets. Each logical dataset comprises a schema for data independent of a format of corresponding data in a physical dataset, and the data processing system comprises a dataset multiplexer that is configurable to provide an application with access to physical datasets in data stores. The method comprises receiving information relating to a first physical dataset stored in a first data store of the data stores, wherein the application is programmed for access of a first logical dataset, and wherein the first physical dataset corresponds to the first logical dataset; generating a first program for accessing the first physical dataset from the first data store based on the received information, wherein generating the first program comprises: identifying a type of the first data store from the received information; selecting a first program template for the type of the first data store; and populating the first program template with one or more values for one or more parameters of the first program template to generate the first program; and storing in an object information to invoke execution of the first program from within the application programmed for access of the first logical dataset.

According to one aspect, populating the first program template comprises automatically discovering one or more values for one or more first parameters of the first program template based on the information relating to the first physical dataset.

According to one aspect, the one or more first parameters comprise information regarding a record format or schema associated with the first physical dataset.

According to one aspect, storing in the object information to invoke execution of the first program from within an application programmed for access of the first logical dataset comprises storing an identifier of the first data store.

According to one aspect, storing in the object information to invoke execution of the first program from within an application programmed for access of the first logical dataset comprises storing a logical identifier of the first logical dataset.

According to one aspect, generating the first program further comprises: obtaining information regarding one or more second parameters of the first program template, wherein the one or more second parameters are different from the one or more first parameters.

According to one aspect, the one or more second parameters specify a manner in which to access the first physical dataset.

According to one aspect, generating the first program further comprises: determining whether a program template is available for the type of the first data store; and based on determining that the first program template is available for the type of the first data store, selecting an available template as the first program template.

According to one aspect, the method comprises based on determining that a program template is not available for the type of the first data store: creating a program structure based on user input; and generating the first program for accessing the first data store based on the created program structure.

According to one aspect, the method comprises receiving information relating to a second physical dataset stored in a second data store of the data stores; and generating a second program for accessing the second physical dataset from the second data store based on the information relating to the second physical dataset.

According to one aspect, the data processing system is configured to execute in multiple environments, with each environment comprising an instance of the data processing system; and the object is assigned an identifier unique within a scope of each of the multiple environments and comprises at least a portion that is common across the multiple environments.

According to some aspects, a method, performed by a data processing system, for enabling efficient analysis in a dynamic environment with multiple datasets by updating entries in a dataset catalog to facilitate access to physical datasets in data stores is provided. The data processing system is configured to execute data processing applications programmed for access to data represented as logical datasets. Each logical dataset comprises a schema for data independent of a format of corresponding data in a physical dataset, and the data processing system comprises a dataset multiplexer that is configurable to provide an application with access to the physical datasets in the data stores. The method comprises receiving information relating to a first physical dataset stored in a first data store that corresponds to a first logical dataset; generating a first program for accessing the first physical dataset from the first data store based on the received information; detecting an event indicating a change associated with a physical dataset corresponding to the first logical dataset; and based on the detection of the event, modifying the first program for accessing a physical dataset corresponding to the first logical dataset.

According to one aspect, the physical dataset is the first physical dataset and the event indicating a change associated with the physical dataset comprises an event indicating a change from the first data store storing the first physical dataset to a second data store, and the method further comprises: in response to detecting the event indicating the change from the first data store to the second data store, modifying the first program to access the first physical dataset from the second data store.

According to one aspect, the physical dataset is the first physical dataset and the event indicating a change associated with the physical dataset comprises an event indicating a change to values of parameters used to generate the first program for accessing the first physical dataset.

According to one aspect, detecting an event indicating a change associated with a physical dataset comprises detecting an event indicating a replacement of the first physical dataset with a second physical dataset corresponding to the first logical dataset, and modifying the first program for accessing the physical dataset comprises replacing the first program with a second program for accessing the second physical dataset.

According to one aspect, the data processing system is configured to invoke the first program to perform an operation within an application specifying access to a first logical dataset; the data processing system is configured to execute in multiple environments, with a first environment comprising a first instance of the data processing system and a second environment comprising a second instance of the data processing system, the first data store and the first program are associated with the first instance of the data processing system, and the method further comprises: generating a second program to perform an operation within an application specifying access to the first logical dataset within the second instance of the data processing system.

According to one aspect, executing the application specifying access to the first logical dataset in the second environment and accessing the second program so as to access a second physical dataset in response to execution of an operation with the application on the first logical dataset.

According to some aspects, a method, performed by a data processing system, for enabling efficient data analysis in a dynamic environment with multiple datasets by using entries in a dataset catalog to enable an application to access a plurality of physical datasets in a plurality of data stores is provided. The data processing system is configured to execute data processing applications programmed to access logical datasets. Each logical dataset comprises a schema for data independent of a format of corresponding data in a physical dataset, and the data processing system comprises a dataset multiplexer that is configurable to provide an application with access to plurality of physical datasets in the plurality of data stores. The method comprises executing within the application an operation specifying access to a logical dataset, by: accessing a dataset catalog to select an object associated with the logical dataset; and invoking a program configured for access of a data source storing a physical dataset corresponding to the logical dataset based on the selected object.

According to one aspect, the method further comprises: dynamically updating objects within the dataset catalog in response to events indicating changes in physical storage of logical data sets represented by the objects within the data catalog.

Various aspects described above may be used alternatively or additionally with aspects in any of the systems, methods, and/or processes described herein. Further, a data processing system may be configured to operate according to a method with one or more of the foregoing aspects. Such a data processing system may comprise at least one computer hardware processor, and at least one non-transitory computer-readable medium storing processor executable instructions that, when executed by the at least one computer hardware processor, cause the at least one computer hardware processor to perform such a method. Further, a non-transitory computer-readable medium may comprise processor executable instructions, that when executed by at least one computer hardware processor of a data processing system, cause the at least one computer hardware processor to perform a method with one or more of the foregoing aspects. As such, the foregoing is a non-limiting summary of the invention, which is defined by the attached claims.

BRIEF DESCRIPTION OF DRAWINGS

Various aspects will be described with reference to the following figures. It should be appreciated that the figures are not necessarily drawn to scale. Items appearing in multiple figures are indicated by the same or a similar reference number in all the figures in which they appear.

DETAILED DESCRIPTION

Figure 1A:
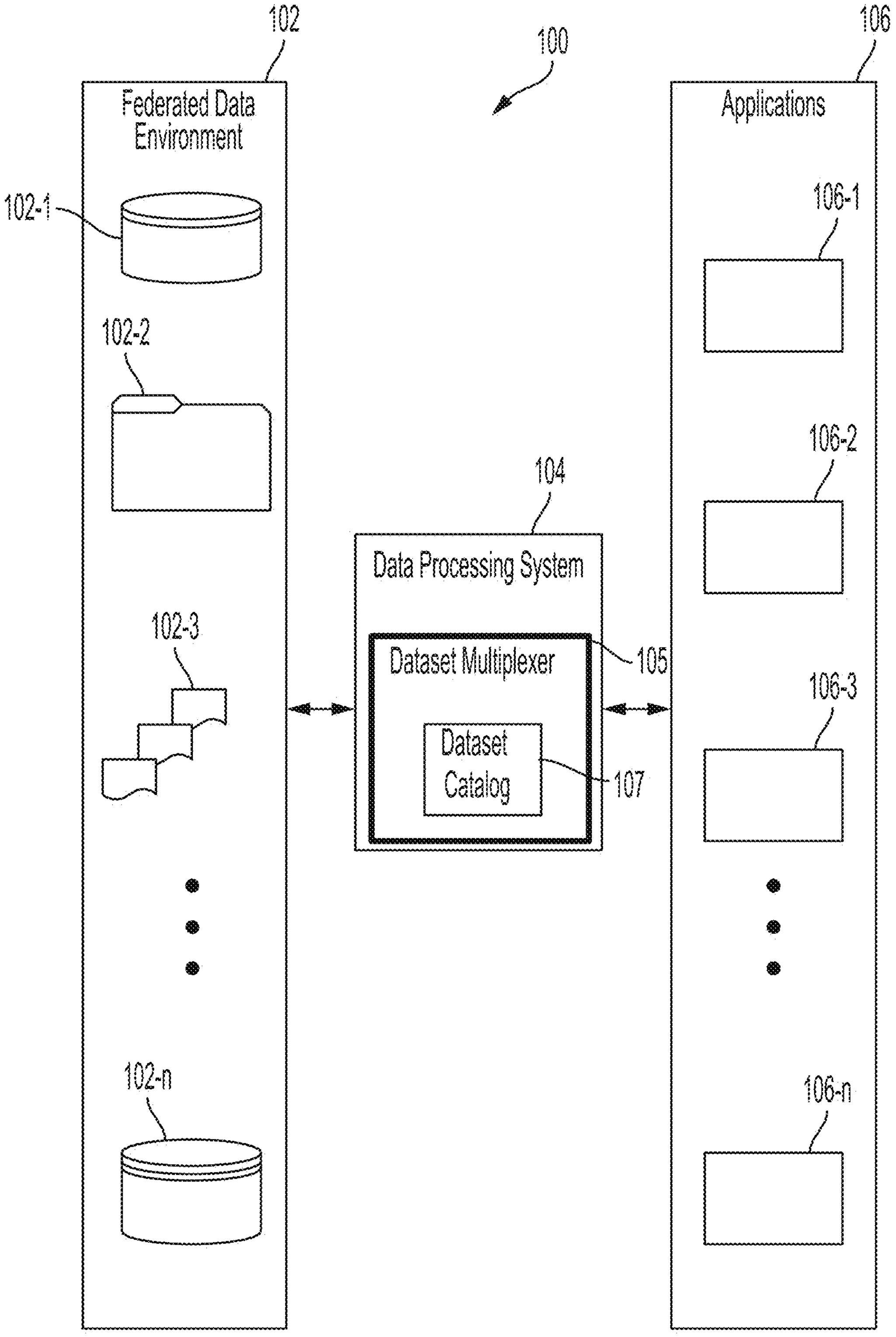
FIG. 1A is a block diagram of an exemplary enterprise IT system with a data processing system having a dataset multiplexer according to an aspect of the technology described herein.

The inventors have recognized and appreciated that a dataset multiplexer may enable efficient operation of a data processing system. In an enterprise with many datasets that may be stored in a variety of data stores, the dataset multiplexer enables the use of applications written in terms of one or more logical datasets rather than written in terms of physical datasets. These applications written in terms of logical datasets do not need to be modified for proper operation if the data store storing physical dataset(s) represented by the logical dataset changes. To support this dynamic updating of the data store, the dataset multiplexer may maintain a catalog of datasets, with each entry in the catalog providing information for accessing the data store in which the physical dataset(s) represented by the logical dataset are stored. The dataset multiplexer, for example, may enable efficient analysis in a dynamic environment in which the physical storage of datasets may evolve or change.

By using the dataset multiplexer, applications can be written and executed without the applications having knowledge of the format (e.g., record format or schema) supported by data stores accessed by the applications, or even physical location, of these data stores. Also, a business user who has no knowledge of the physical datasets and the data stores but understands how to extract business insights from data, for example, is enabled to write applications in terms of logical datasets rather than in terms of physical datasets. The dataset multiplexer may automatically supply connections between the applications and the appropriate data stores storing the physical datasets represented by the logical datasets, avoiding the need for the application and the user to have knowledge of the implementation of the data stores.

The catalog of datasets may be updated in response to events indicating changes to the storage of the datasets, such as physical datasets represented by the logical dataset. The application and/or logical dataset may not need to be changed in response to the events. By obtaining information from the catalog for accessing the data store storing a physical dataset corresponding to a logical dataset of the application at the time of access, the appropriate data store may be accessed without needing to maintain the application to accommodate for changes in data stores. In an enterprise, this capability may facilitate migration of datasets from one storage location to another to enable efficient use of computer storage while maintaining proper execution of the application. For example, throughout its life cycle, a dataset may be migrated from one storage location to another or may even be migrated from one type of storage to another. Such migration can occur without modifying any applications and while maintaining proper execution of the applications. Avoiding the need to modify applications even when such changes occur provides reliable and efficient execution of the application and can provide a substantial cost savings to an enterprise, as the cost and downtime to modify and re-test the modified application is avoided.

As a specific example, a physical dataset may be initially stored as a file. Storage as a file may enable use of low-cost computer storage. As the amount of data in the physical dataset grows or the data becomes more valuable, the physical dataset may be migrated to a database system to enable fast processing of the large dataset or more fault tolerance. By updating the catalog entry for a logical dataset corresponding to the physical dataset, applications written to access the logical dataset through the dataset multiplexer continue to operate without modification when the physical dataset migrates from a file to a database system.

The catalog entry may include information for accessing a physical dataset that can accommodate other types of changes to the storage of data associated with the logical dataset. This information may include a program that, when executed, accesses data from the data store as well as converts it to a representation of the logical dataset. As a specific example, the format of fields in a physical dataset used to store a logical entity may change without impact to the application that references the logical entity because modification of the entry in the dataset catalog may include modification of the program that converts data in the data store to the format used in the logical dataset.

A dataset multiplexer may also facilitate development of applications by simplifying transitions between programming environments. For example, applications are conventionally developed in a development environment, tested in a test environment and then promoted to a production environment. In the production environment, the application may read and write to one or more data stores with “live” data used throughout the enterprise. In the test and development environments, the application may be operated with offline data stores that, if corrupted by improper operation of the application, are unlikely to impact the enterprise. In the development environment, the data stores may be relatively small while in the test environment the data stores may be structured to provide robust test cases, including extreme test cases that might not appear in the current live data.

Regardless of the reasons that different datasets are desirable in different environments each environment may have its own dataset catalog information. An instance of the data processing system providing the development environment may access the data catalog information scoped for the development environment. Likewise, the instances of the data processing system providing the test or production environments may access the data catalog information scoped for their respective environments to access an appropriate data store. In this way, an application written to access logical datasets may operate in any of the environments and automatically access the appropriate data store in each environment without the need to adapt the application to the particular environment. When execution of the application involves an operation on a logical dataset, the data processing system automatically utilizes the appropriate data catalog information for the appropriate environment to access the data store containing the physical dataset in that environment storing data corresponding to the logical dataset.

The value of such a dataset multiplexer may be enhanced with a dataset multiplexer capable of automatically constructing an entry in a dataset catalog for a data store. The dataset multiplexer, for example, may maintain a set of program templates applicable to different types of data stores. Upon registration of a data store with the dataset multiplexer, the dataset multiplexer may detect the type of the data store and select an appropriate template. The program for access to that data store may be constructed by populating the selected template with the values of parameters detected from analyzing the data store. Some or all of the values of parameters may alternatively or additionally be obtained from a metadata repository maintaining metadata for the data stores, supplied via user input or obtained in other ways.

Aspects of a data processing system may be implemented to achieve any or more the foregoing objects and advantages. These objects and advantages may be used alone or together in any suitable combination.

Representative Data Processing System with a Dataset Multiplexer

FIG. 1A is a block diagram of an IT system 100 including an illustrative data processing system 104 and a dataset multiplexer 105 integrated with the data processing system 104, in accordance with some aspects of the technology describes herein. IT system 100, for example, may be an IT system of an enterprise, such as a financial company. For simplicity, elements of an enterprise IT system, such as networks, cloud storage, and user devices, are not expressly shown.

Data processing system 104 is configured to access (e.g., read data from and/or write data to) data stores 102-1, 102-3, 102-3, . . . , and 102-*n*. Each of the data stores 102-1, 102-3, 102-3, . . . , and 102-*n*, may store one or more physical datasets. A data store may store any suitable type of data or collection of data in any suitable way or format. A data store may store data as a flat text file, a spreadsheet, using a database system (e.g., a relational database system), for example. Moreover, these data stores may be internal or external to the enterprise. External data stores, for example, may be "in the cloud," or otherwise in storage hardware managed by a third party. Accordingly, the data stores may provide a federated environment in which different data stores used by an enterprise may be in different locations and/or managed by different entities inside or outside the enterprise.

In some instances, a data store may store transactional data. For example, a data store may store credit card transactions, phone records data, or bank transactions data. It should be appreciated that data processing system 104 may be configured to access any suitable number of data stores of any suitable type, as aspects of the technology described herein are not limited in this respect. A data store from which data processing system 104 may be configured to read data may be referred to as a data source. A data store to which data processing system 104 may be configured to write data may be referred to as a data sink. However, techniques as described herein may be applied to data stores holding other types of data that are used in an enterprise.

Each data store may be implemented with one or multiple storage devices and may include data management software or other control mechanism to support the storage of physical datasets in one or more formats of any suitable type. The storage device(s) may be of any suitable type and may include, for example, one or more servers, one or more disc arrays, one or more clusters of disk arrays, one or more portable storage devices, one or more non-volatile storage devices, one or more volatile storage devices, and/or any other device(s) configured to store data electronically. In embodiments where a data store includes multiple storage devices, the storage devices may be co-located in one physical location (e.g., in one building) or distributed across multiple physical locations (e.g., in multiple buildings, in different cities, states, or countries). The storage devices may be configured to communicate with one another using one or more networks of any suitable type, as aspects of the technology described herein are not limited in this respect.

The data management software may organize the data in physical storage and provide a mechanism to access the data such that data may be written to or read from physical storage. The data management software may be, for example, a database system or a file management system. Depending on the type of data management software, the storage device(s) may store physical datasets using one or more formats such database tables, spreadsheet files, flat text files, and/or files in any other suitable format (e.g., a native format of a mainframe). The data stores 102-1, 102-2, 102-3, . . . , and 102-*n* may be of a same type (e.g., all may be relational databases) or different types (e.g., one may be a relational database while another may be a data store that stores data in flat files). When the data stores are of different types, the storage environment may be referred to as a heterogenous or federated data environment 102. A data store may be, for example, a SQL server database, an ORACLE database, a TERADATA database, a flat file, a multi-file data store, a HADOOP distributed database, a DB2 data store, a Microsoft SQL SERVER data store, an INFORMIX data store, a table, collection of tables or other subpart of a database, and/or any other suitable type of data store, as aspects of the technology described herein are not limited in this respect.

Data processing system 104 supports a wide variety of applications 106 to perform functions that access (e.g., read and/or write access) physical datasets stored in data stores 102-1, 102-3, 102-3, . . . , and 102-*n*. Applications 106 may then perform operations based on data in the data stores. Data processing system 104 may support applications 106-1, 106-2, 162-3, . . . , and 106-*n* that may be of a same type or different types. In some instances, an application may, when executed, read or write transactional data to or from one or more physical datasets in a data store. In other instances, an application may, when executed, read or write data to or from physical datasets stored across different data stores and analyze the data in order to extract business insights from the datasets.

Figure 3A:
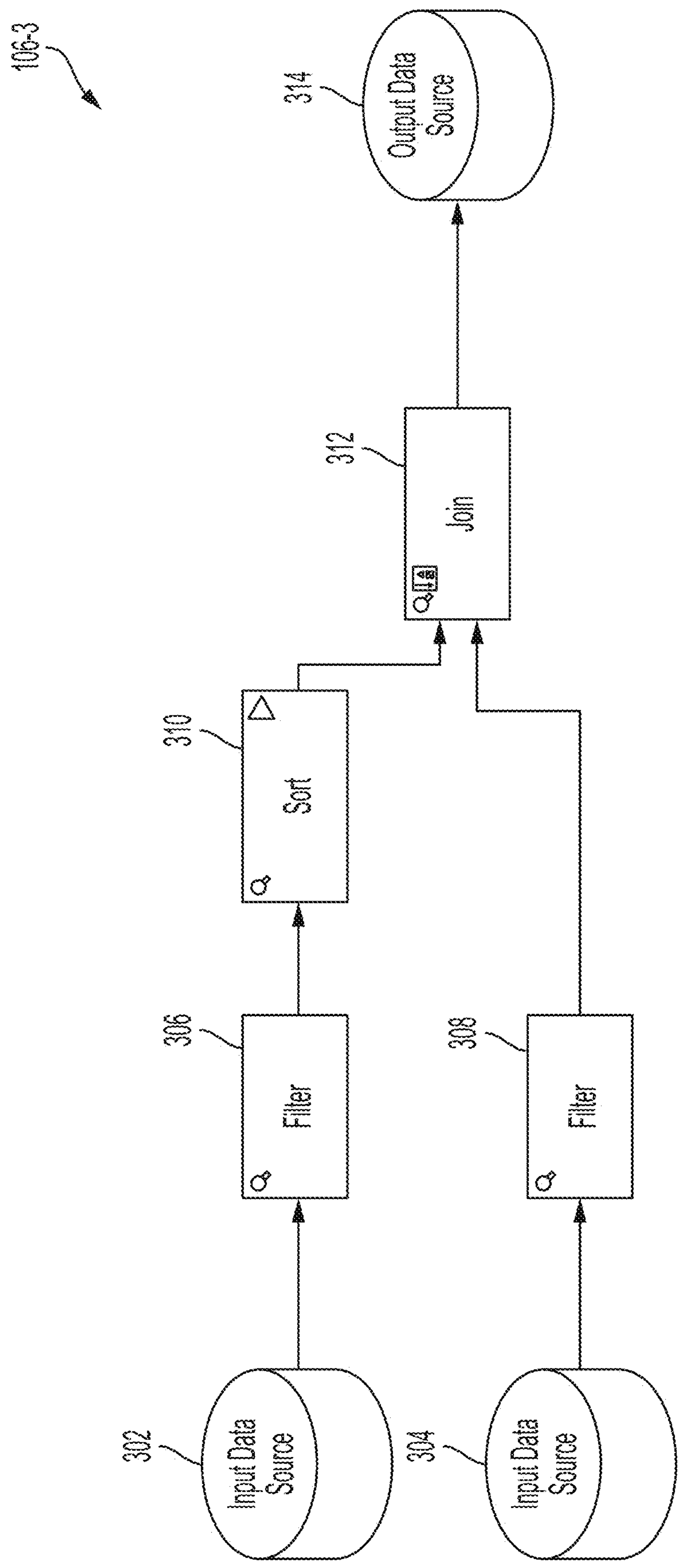
FIG. 3A is a schematic illustration of a graphical development environment for an application written as a data flow graph.

Applications 106 may be developed as data flow graphs, as shown in FIG. 3A, for example. A dataflow graph may include components, termed "nodes" or "vertices," representing data processing operations to be performed on data and links between the components representing flows of data. Techniques for executing computations encoded by dataflow graphs are described in U.S. Pat. No. 5,966,072, titled "Executing Computations Expressed as Graphs," which is incorporated by reference herein in its entirety. An environment for developing applications (e.g., computer programs) as data flow graphs is described in U.S. Pat. Pub. No.: 2007/0011668, titled "Managing Parameters for Graph-Based Applications," which is incorporated by reference herein in its entirety. The dataflow graph may include data sources (such as input data stores 302 or 304, FIG. 3A) and data sinks (such as output data store 314, FIG. 3A). These are represented by terminal nodes in the flows that signify access to a data store 102-1, 102-3, 102-3, . . . , or 102-*n*.

However, the application itself need not be programmed with the specific data store included in the application. Rather than being hard coded to access a single physical dataset, applications 106 may be programmed in terms of logical datasets. A logical dataset may refer to a logical representation of one or more datasets. The data processing system 104 may store definitions of multiple logical datasets as well as other metadata about those logical datasets. This information may be managed, for example, by a metadata management module (e.g., metadata management module 526, FIG. 5A). Tools used with data processing system 104 may access metadata about logical datasets and perform functions based on that metadata. For example, a program development environment may provide a user interface through which available logical datasets may be selected and used in programming an application.

A logical dataset may have a schema that defines data independently of the format of the corresponding data in a physical dataset/data store. A logical dataset, for example, may have a schema that defines logical entities in the logical dataset. The logical entities may be recognizable and/or understandable to a human user. For example, a logical dataset may include a logical entity such as customer name. In a physical dataset corresponding to this logical dataset, a customer name might be stored as three fields in a row of a data table, holding data corresponding to the customer's first name, middle initial and last name, respectively. The logical dataset, however, may simply include a logical entity Customer_Name without regard to the format of the data in physical storage.

Data processing system 104 may include an interface (not shown) through which a schema for a logical dataset may be defined. The interface, for example, may be a user interface through which a user may specify or otherwise introduce into the system a logical dataset by specifying its schema. In some embodiments, data processing system 104 may store a set of logical entities that are commonly used in the business of the enterprise. Examples of commonly used logical entities may include one or more of a name, identification number, phone number, address, country of citizenship, account balance, transaction amount, or date. Those business terms may be used to specify, at least partially, the schema of the logical dataset. However, the schema may be defined as including, instead or in addition to predefined logical entities, and other logical entities.

Enabling programing of applications in terms of logical datasets avoids the need for the programmer creating the application to understand the format of the data store storing the corresponding physical data set. As a result, a data analyst might develop applications using logical datasets, even if that data analyst does not understand the format of data within the data stores holding the physical datasets.

As a more detailed example, within an enterprise a programmer may define a logical dataset storing new customers. The schema for the logical dataset may include logical entities, such as customer name, customer address, customer identifier, and date of customer acquisition, for example. The data analyst may write the application in terms of the logical dataset and these logical entities, regardless of the storage format of the physical dataset corresponding to the logical dataset. As a result, the data analyst may write the application without knowledge of the physical dataset storing data to be accessed by the application.

At the time of execution of the application, data in a physical dataset corresponding to the logical dataset may be stored in one or more of the data stores 102-1, 102-3, 102-3, . . . , and 102-*n*. To execute the application, each operation specifying access to the logical dataset may be executed by data processing system 104 reading or writing data from the corresponding physical dataset stored in one of data stores 102-1, 102-3, 102-3, . . . , and 102-*n*. In accordance with some aspects, dataset multiplexer 105 may enable automated execution of such operations by automatically accessing the corresponding physical dataset. The access may include converting between the format of data as stored in the physical data store and the format as specified in the schema for the logical dataset. As another example, the conversion may result in associating data from the physical dataset with metadata that has been associated with the logical dataset. As a specific example, the conversion may associate a field from the physical dataset with a field in a logical dataset that is tagged with an indication that it holds personally identifiable information. As a result, the metadata may be used in operations on the data from the physical dataset, such as to filter or mask personally identifiable information, in that example.

As shown in FIG. 1A, data processing system 104 includes dataset multiplexer 105 for automating access to a corresponding physical dataset and conversion between the format for the logical and physical datasets. Dataset multiplexer 105 may maintain a catalog of datasets 107, where each entry in the catalog corresponds to a logical dataset and provides information for accessing one or more physical datasets. For example, a catalog entry may identify a physical dataset in a data store 102-1, 102-3, 102-3, . . . , or 102-*n* corresponding to the logical dataset. The catalog entry may alternatively or additionally include information for converting data as stored in the physical dataset to a format of the logical dataset. That information may be or may include an executable program. For example, catalog information may identify a program for converting data in multiple fields in a physical dataset to the format of a corresponding logical entity in the logical dataset. Other information may alternatively or additionally be stored as or reflected in the catalog information for accessing the one or more physical datasets.

Figure 1B:
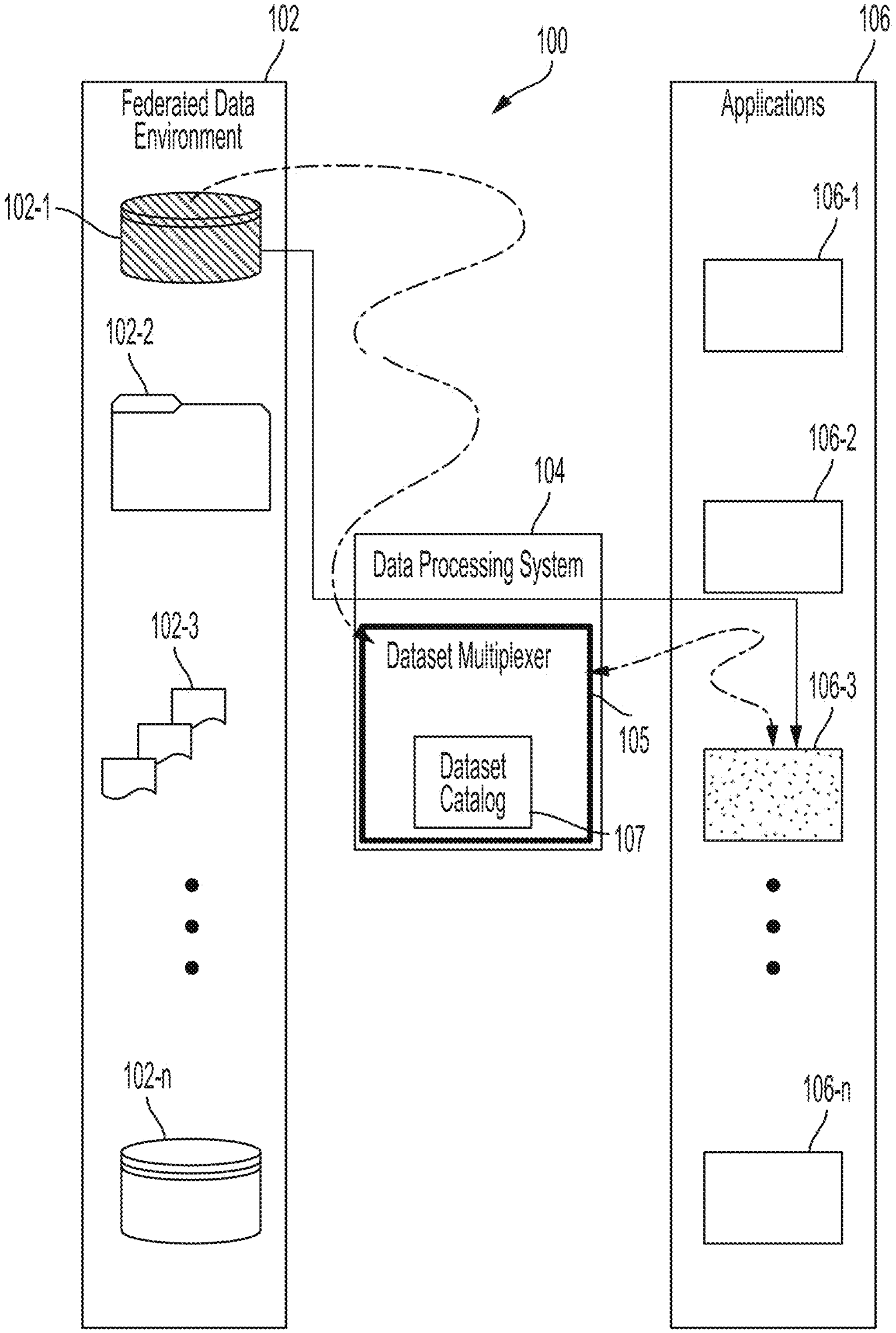
FIG. 1B is a block diagram of the exemplary enterprise IT system of FIG. 1A in an operating state at a first time during which the dataset multiplexer facilitates access between an application, configured to access a logical dataset, and a first data store storing a physical dataset corresponding to the logical dataset.

Dataset multiplexer 105 enables applications 106 to seamlessly access physical dataset(s) based on the programmed logical dataset(s) using the information in the catalog of datasets. FIG. 1B illustrates an application (e.g., application 106-3) programmed to access data in accordance with a logical dataset. Upon execution of an operation to access (e.g., read and/or write) a logical dataset, dataset multiplexer 105 of the data processing system 104 may enable access to a corresponding physical dataset(s) in a data store (e.g., data store 102-1). For example, when the catalog information stored for the logical dataset is or includes an access control program, that program may be executed. As a result, even though application 106-3 is programmed in terms of a logical dataset, when data access operations are executed, a physical dataset stored in data store 102-1 is accessed.

The dataset multiplexer 105 may access its catalog of datasets to select an entry associated with the logical dataset referenced in application 106-3. The information for identifying the physical dataset stored in data store 102-1 and/or converting data in the format of data store 102-1 to the format of the logical dataset may then be used for data access.

In some instances, this access may be dynamic. The catalog information may be used at the time of execution of an operation in the application that requires data access. The entry associated with the logical dataset in the catalog of datasets may be updated in response to an event indicating a change to the storage of information associated with the logical dataset. Access of the physical datastore via the catalog information may ensure that the application continues to execute despite changes that might be made at any point throughout the IT system 100, even if the data analyst or other user who wrote application 106-3 was unaware of those changes.

For example, a physical dataset may be migrated from data store 102-1 to data store **102-*n*. The logical dataset that the application is programmed with need not be modified to account for this change. By updating the catalog entry for the logical dataset, the dataset multiplexer 105 may automatically utilize the updated catalog information to provide application 106-3** access to the correct physical dataset regardless of the data store in which it resides.

Figure 1C:
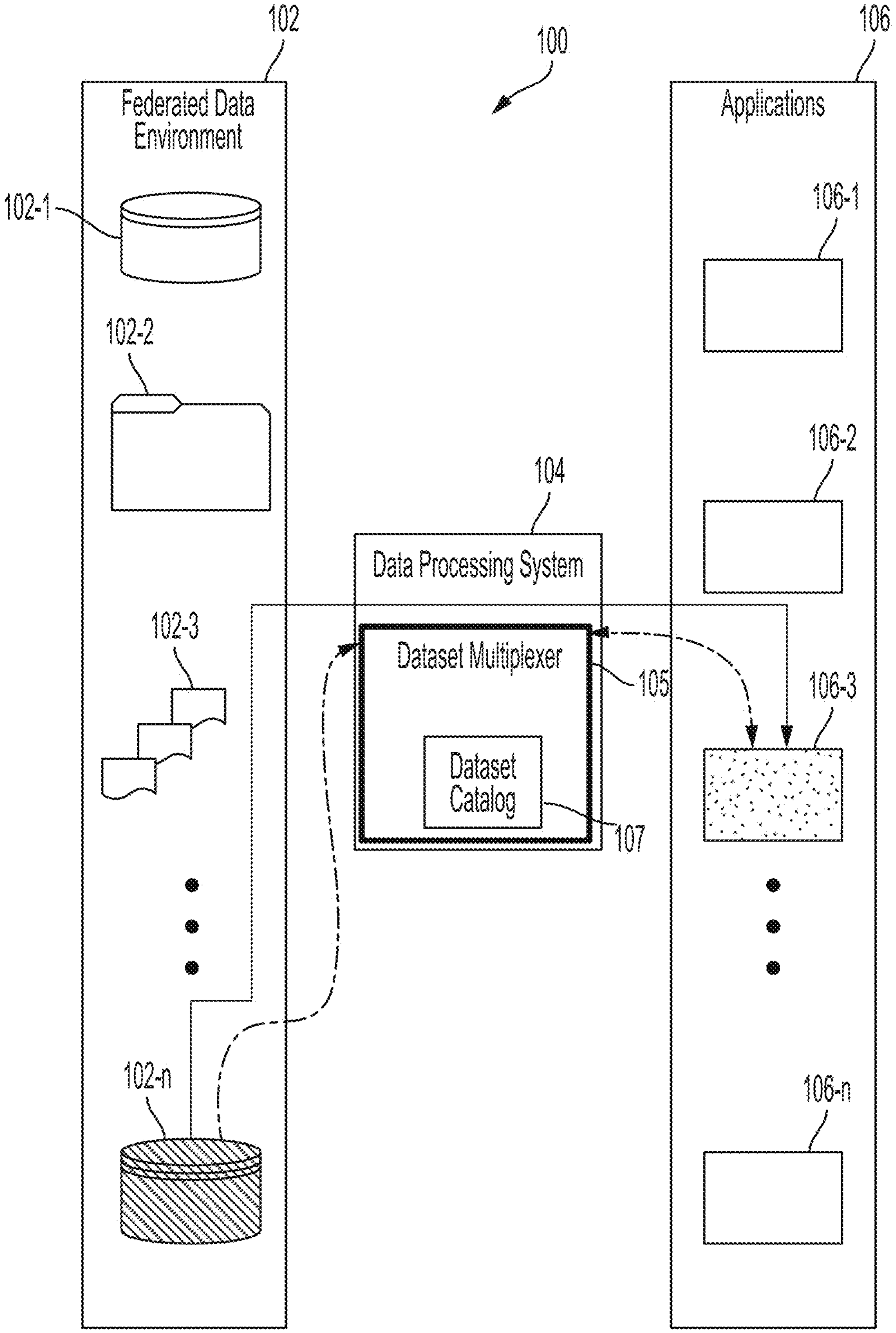
FIG. 1C is a block diagram of the exemplary enterprise IT system of FIG. 1B in an operating state at a second time during which the dataset multiplexer facilitates access between the application, configured to access the logical dataset, and a second data store storing the physical dataset corresponding to the logical dataset.

FIG. 1C illustrates application 106-3 accessing data store **102-*n* via the dataset multiplexer 105 of the data processing system 104. The access conditions in FIG. 1B and FIG. 1C may be the result of execution of application 106-3 at different times. Because the catalog information is dynamic and changes to account for storage of the dataset, no changes of application 106-3** are required for correct access to the desired data.

In FIG. 1B, a solid line indicates a flow of data from the data store 102-1 to the application 106-3 upon execution of an operation to access (e.g., read and/or write) a logical dataset. Dashed lines indicate interactions between components that may control the flow of data in operation. For example, application 106-3 may interact with dataset multiplexer 105 to obtain information for accessing a physical dataset corresponding to a logical dataset from the catalog entry associated with the logical dataset. Dataset multiplexer 105 may obtain information from a corresponding physical dataset(s) in the data store 102-1 to generate the appropriate catalog entry. Similarly, the solid line in FIG. 1C indicates a flow of data from the data store **102-*n* to the application 106-3 upon execution of an operation to access (e.g., read and/or write) a logical dataset and the dashed lines indicate interactions between components (e.g., dataset multiplexer 105, application 106-3, and data store 102-*n***) that may control the flow of data in operation.

Using dynamic data may enable correct operation despite any of a number of other types of changes within IT system 100. In addition to changes in the data store in which the physical dataset is stored, the type of data store holding the dataset may change. For example, the type of the data store may change. Data store 102-1, for example, may be an Oracle database, but data store **102-*n*** may be a SQL server data store. As another example, the schema of the physical dataset may change, such as to include an additional field for name data. Such changes are automatically compensated for by changing the conversion logic within the catalog.

Dynamically using dataset catalog information for data access may automatically handle other types of changes. As another example, a user may run different instances of a data processing system for different purposes. It may be desirable for the same application to access different physical datasets when executing in different instances. Such execution may be ensured by providing different catalog information in different instances or otherwise where it is desirable for an application to access different physical datasets that correspond to the same logical dataset in different contexts.

Figure 2A:
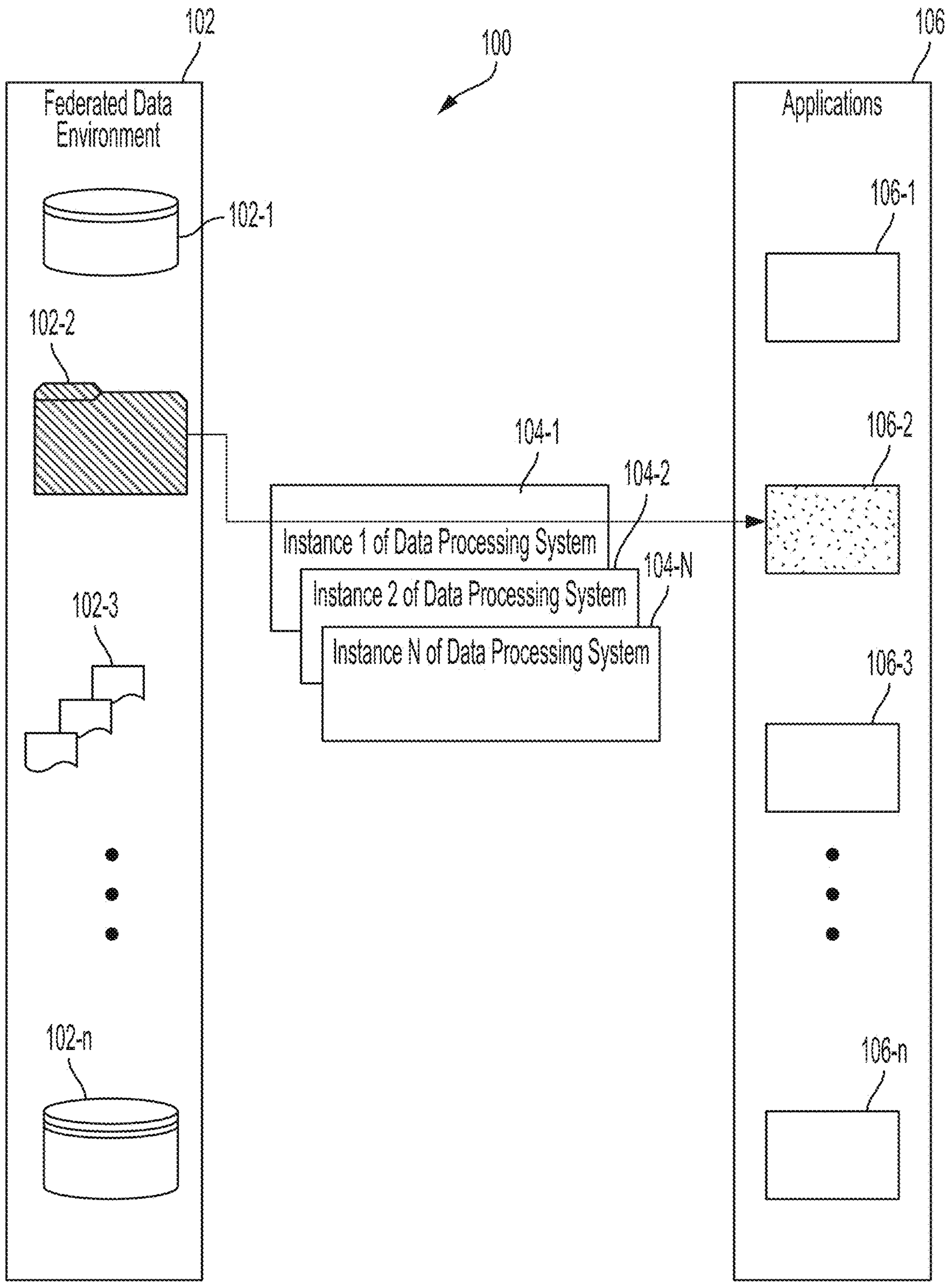
FIG. 2A is a block diagram of an exemplary enterprise IT system in which the data processing system of FIG. 1A is instantiated in multiple instances to provide multiple environments, with an application being executed by the first instance for which the dataset multiplexer facilitates access between an application and a first physical dataset.
Figure 2B:
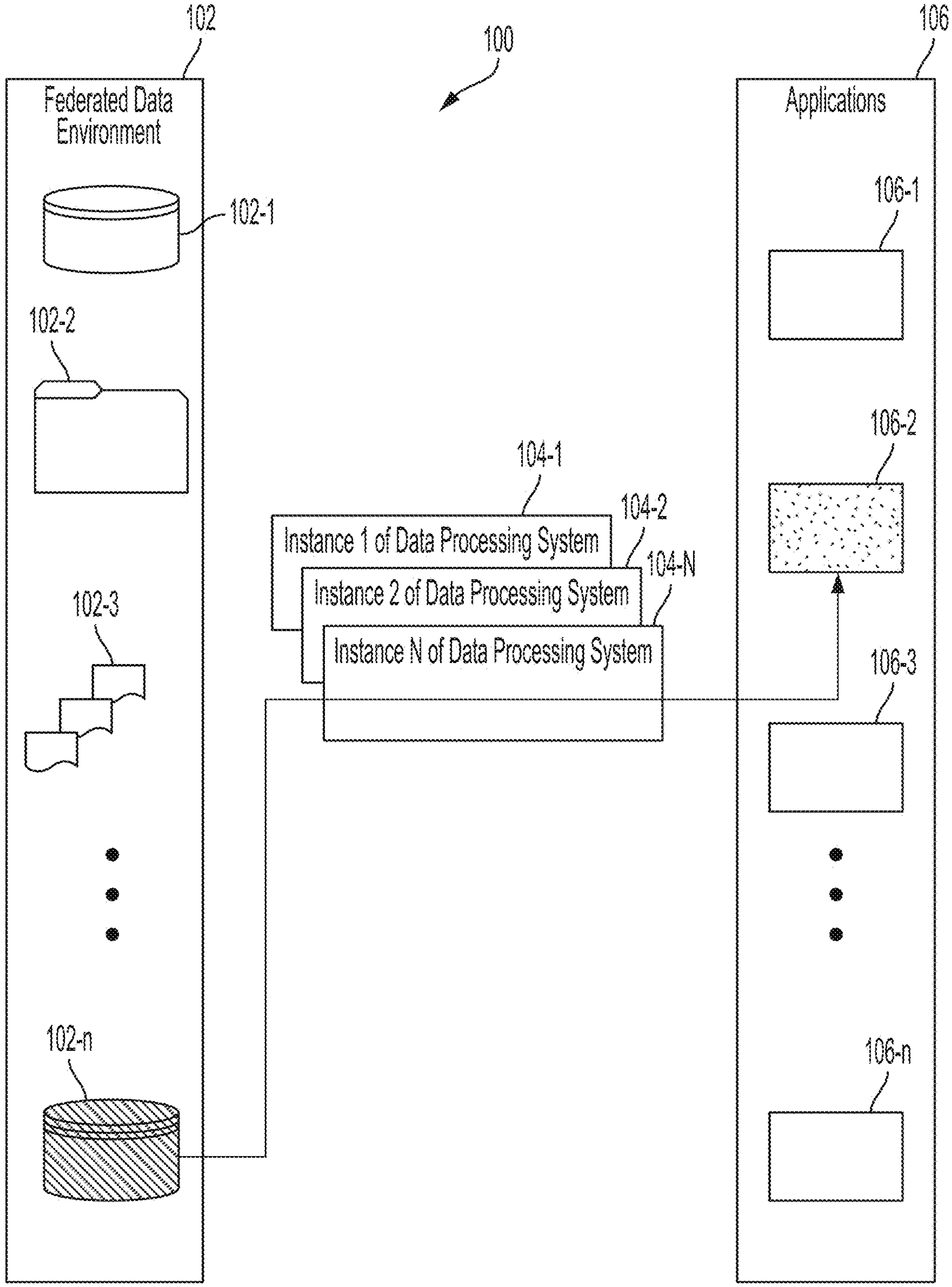
FIG. 2B is a block diagram of an exemplary enterprise IT system of FIG. 2A, with an application being executed by the third instance for which the dataset multiplexer facilitates access between an application and a second physical dataset.

FIG. 2A illustrates an application (e.g., application 106-2) accessing physical dataset(s) in a data store (e.g., data store 102-2) via a dataset multiplexer of an instance of a data processing system (e.g., instance 104-1 of data processing system 104), in accordance with some aspects of the technology described herein. In the environment created by instance 104-1 access to a logical dataset is resolved to a dataset in data store 102-2. That same application executed in a different environment, created by a different instance **104-*n* of the data processing system, may access a different physical dataset. FIG. 2B illustrates application 106-2 accessing data store 102-*n* (e.g., a database data store) in the environment created by instance 104-*n* of the data processing system 104. For simplicity of illustration, separate lines showing control flow among the illustrated components are not shown in FIGS. 2A and 2**B. It should be appreciated, however, that components of a data processing system may interact to control the operations described herein. Accordingly, control interactions may be omitted for simplicity.

The operation illustrated by FIGS. 2A and 2B may be created by scoping catalog information for each instance such that reference to the same logical dataset within each scope may access a physical dataset through the catalog information for that scope. All or a portion of the identifier of a logical dataset may be persistent across scopes. As a specific example, the logical dataset may be identified by a combination of a name and schema, which may be the same regardless of the environment. However, the dataset catalog information associated with that logical identifier may differ in different instances.

In the embodiments of FIGS. 2A and 2B, different instances 104-1, 104-2, . . . , **104-*n* of data processing system 104** may be provided for different programming environments. As a specific example, an enterprise may operate a data processing system in development, test, and production environments. The datasets used by the same application may differ in each of these environments. Live data as is used in the production environment may not be used in either development or test environments to avoid corruption of the live data and/or minimize the risk of exposing sensitive information. The data store for the production environment may be large and provide fast data access, and therefore be very expensive. The dataset for the development environment, on the other hand, may be small and stored in a low cost datastore to reduce the cost of application development. The dataset for the test environment may include data that might arise in rare operating scenarios that is not, at the time of testing the application, in the live dataset to ensure robust testing and full code coverage. Enabling of an application in any environment enables efficient movement between environments, such as development, test and production, and may enhance the efficiency of application development and overall operation of the IT system.

Each instance of the data processing system 104 may include a dataset multiplexer that maintains a catalog of datasets for the corresponding environment. Each dataset multiplexer may access the respective catalog of datasets for the appropriate environment to provide access to appropriate data store(s). For example, FIG. 2A illustrates an application 106-2 accessing data store 102-2 (e.g., a flat file data store) in a development environment via instance 104-1 of the data processing system 104. FIG. 2B illustrates application 106-2 accessing data store **102-*n*, which may be a database, in a production environment via instance 104-*n* of the data processing system 104**.

Representative Techniques for Developing an Application with a Dataset Multiplexer In some embodiments, an application executed by a data processing system may be written in a graphical programming language by a human user of the data processing system. In other embodiments, a procedural language or other type of programming language may alternatively or additionally be used.

FIG. 3A illustrates a graphical user interface through which a data analyst or other human user may write an application in a graphical development environment and is used herein as an example of application development. In this example, the data processing system includes a library of components that perform operations on data. Though not expressly shown in FIG. 3A for simplicity, a graphical development environment may include a toolbar or other user interface element through which a user may select components from that library. The user may also specify connections between these components to form the graph. For example, components may specify operations to transform data or may specify a data source or a data sink that is to be accessed. Components may be represented by icons that have different shapes depending on the operation that is performed by the component or the type of data store holding the data for the data source or data sink.

The user may write an application by selecting components corresponding to desired operations and connecting them together in an order that specifies a desired data flow through the operations represented by the components. Each of the components may be configured through user input of parameters. Values of some configuration parameters may specify aspects of the operation of the component. A component representing a dataset, for example, may be receive a parameter that specifies operation as a data source or data sink.

In embodiments in which the application is written using logical datasets, values of some configuration parameters may specify a specific logical dataset and/or logical entities in the logical dataset for use in performing an operation of the component. For example, a component representing a dataset may be configured to represent a designated logical dataset by supplying as the value of that parameter an identifier of the logical dataset. A component alternatively or additionally may be configured with user input specifying a logical entity to be used as a key in a particular operation.

A data processing system may include a repository of information about logical datasets and/or logical entities that are available for use in configuring components of an application. Entries in this repository may have been created by the user writing the application. However, in an enterprise there may be many individuals involved in generating and analyzing data such that the information in the repository may not have been developed by the user developing the application. The logical dataset information, for example, may have been created by other users or even by automated analysis of certain physical datasets.

A user interface provided in the development environment may include user interface elements enabling a user to designate logical datasets or logical entities in the repository as the values of parameters that configure components of a graph. Those user interface elements may include elements for the user to input a search query. The query may, for example, be a faceted query in which the user specifies one or more values of dimensions that describe the logical datasets or logical entities. Those dimensions, for example, may include words entered in the repository to describe the logical dataset or the names of fields included within the dataset.

The data processing system may execute the search according to the query and return a list of options selected by the data processing system based on the query. The user may then select a returned value to configure a component, and the component will thereafter operate per the selection. For example, when a dataset component is configured as a data source configured to output data from a logical dataset, that component will operate, when the application is executed, by supplying in the format of the specified logical dataset.

It is not a requirement that an application be developed fully by a human programmer. All or portions of a program may be generated in other ways, such as from a template or converted by machine from another programming language or pseudo language. Regardless of the manner in which the application is developed, specifying data on which the application will operate in terms of one or more logical datasets enables the application to be written without any knowledge of or dependency on the physical storage of data. This capability can simplify any portions of the development process performed by a human user, as the human user can specify operations involving access to data in terms of the logical dataset and/or logical entities in the logical dataset. A data analyst, for example, may be able to write the application without understanding the details of any particular physical dataset. Further, avoiding dependency on physical storage in the application can expand functionality of the data processing system. The application can be written, for example, even if the details of the physical dataset that will exist at the time the application is executed are not known to the programmer or have not yet been established.

As a further simplification, a data processing system may be configured to perform operations specified in terms of logical datasets or logical entities within a logical dataset. These operations may be specified to be performed within an application and might then be performed on data accessed in a physical dataset corresponding to the logical dataset.

For example, a logical entity may be associated with an enterprise-wide list of valid values, and changes might be made to the list at the enterprise level, without need to change each and every application that accesses that logical entity. As a specific example, a logical entity for gender may be defined within a data processing system. At one time, metadata associated with that logical entity may indicate that allowed values are M and F. At a later time, the allowed values may change to be M, F, and X. Every application written in terms of that logical entity may automatically adapt to the changed list regardless of which physical dataset stores gender information. This is advantageous because indicating the "X" value as a newly allowed value in the metadata, for example, may automatically affect all applications that use the logical entity for gender.

As another example, validation rules may be specified in terms of logical entities and applied regardless of the physical dataset from which data is accessed. As a specific example, a data processing system may be configured with a data validation rule for a logical element used for e-mail addresses. That data validation rule may be applied to data from any physical dataset storing e-mails, once one or more fields in that physical dataset are identified as corresponding to the logical element used for e-mail addresses. The validation rules may be used within an application in one or more ways. For example, the rules may be invoked on data from a specific physical dataset from within the application or the application may access results of application of those rules to a particular physical dataset, even if application of the rules to the dataset were triggered from outside the application.

As yet another example, a component that performs a mask or a filter operation may be specified in terms of logical entities and/or metadata about logical entities, and can operate within an application regardless of the physical datastore from which data being processed is pulled. As a specific example, logical entities that act as identifiers of people may be assigned privacy levels. Logical entities may be defined for multiple identifiers of people, such as e-mail address and social security number. Metadata associated with these logical entities may assign a moderate privacy level to an e-mail, but a social security number may be given a high privacy level. A filter or mask component specified in terms of logical entities can be configured to omit from its output records with certain field values associated with a privacy level above a threshold or obscure the values of those fields. When these operations are performed on physical datasets with fields corresponding to e-mail or social security number, they may be performed based on privacy level. Definition of logical datasets and associated metadata, such as privacy level, in a repository that may be used in developing applications enables functions such as these to be efficiently implemented and updated across an enterprise. Such definitions may also be used to enforce enterprise policies relating to data access by ensuring that physical datasets with sensitive information (i.e., datasets including fields containing sensitive information) are handled appropriately.

FIG. 3A illustrates an application (e.g., application 106-3) being developed as a dataflow graph via a user interface in a development environment. Here, the components are represented as nodes in the graph. The dataflow graph in this example includes an input node 302, 304 for each of the physical datasets from which data is read and an output node 314 for each of the physical datasets to which data is written. An example of generating such input and output nodes based on functionality they will provide (e.g., data sink or data source functionality) is described in U.S. Pat. No. 9,977,659, titled "Managing Data Set Objects," which is incorporated by reference herein in its entirety. The dataflow graph also includes nodes 306, 308, 310, 312 for various data processing operations (e.g., filter, sort or join operations) that are performed on the data read from the physical datasets. When the graph is executed by the data processing system, the results of the data processing operations are written to the physical dataset associated with the output node 314.

Each of the input nodes may be configured with parameter values associated with a respective data source. These values may indicate how to access data from the data source. Similarly, each of the output nodes may be configured with parameter values associated with respective data sink. These values may indicate how to write the results to the data sink.

Conventionally, applications, including those written as dataflow graphs as shown in FIG. 3A, would need to be manually updated to account for changes to the way data is stored. For example, if a dataset were migrated from one data store to another data store, an experienced developer would manually change the configuration of an input node and/or output node of the dataflow graph impacted by the migration. Such manual updates would need to be performed by the experienced developer possessing knowledge (e.g., programming knowledge) about the dataflow graphs and the data stores supported by a data processing system. In a data processing system that supports a large number of datasets where changes to the way in which data is stored occur frequently, either introducing an error during updating or neglecting to update an application for each change causes errors to propagate through the enterprise. For example, executing a dataflow graph in which an input node is configured with incorrect or stale parameter values associated with a data source might result in data being read from an incorrect data source or being read in an incorrect format. Errors in input data cause data processing operations to be performed on erroneous data resulting in inaccurate outputs. The incorrect outputs might be readily recognizable, such as jobs that crash or reports that are missing intended information. In other scenarios, the errors are more subtle, where incorrect data is written into a physical dataset, which might be used in subsequent processing with no indication that the data has been corrupted by an error. By the time the erroneous data propagates through the enterprise to the point that it is recognized, many datasets may have been corrupted such that finding and correcting the error may be time-consuming and expensive. In addition, migrating from one data store to another is expensive and time consuming because it requires identifying all physical datasets affected by this change and then manually editing the applications that use and test them.

The inventors have developed techniques for avoiding these problems by automatically providing access to appropriate physical datasets without needing to maintain an application/dataflow graph to accommodate for changes in data storage. By enabling the data processing system to adapt to changes in data storage, the risk for errors introduced in modifying applications is significantly reduced, thereby eliminating the propagation of errors common in the conventional systems.

Such access may be enabled by a dataset multiplexer 105 that automatically provides connections between an application and appropriate physical datasets. An application may be programmed in terms of logical dataset(s). For example, a business user possessing minimal knowledge about physical datasets (e.g., their location or formats) may write the application in terms of the logical dataset(s). The dataset multiplexer 105 may maintain a catalog of datasets, where each entry in the catalog is associated with a logical dataset and provides information for accessing the physical dataset corresponding to the logical dataset in whatever data store it is stored at the time the application is executed. In response to an indication that dataflow graph execution involves an operation on the logical dataset, the dataset multiplexer 105 may obtain the information for accessing the physical dataset from the catalog entry associated with the logical dataset and automatically provide a connection between the dataflow graph and the physical dataset based on the information. In some embodiments, the information for accessing the physical dataset may include a program providing access to the physical dataset. The program, when executed by the application, may access the physical dataset from a data store and convert it to a format of the logical dataset.

Figure 3B:
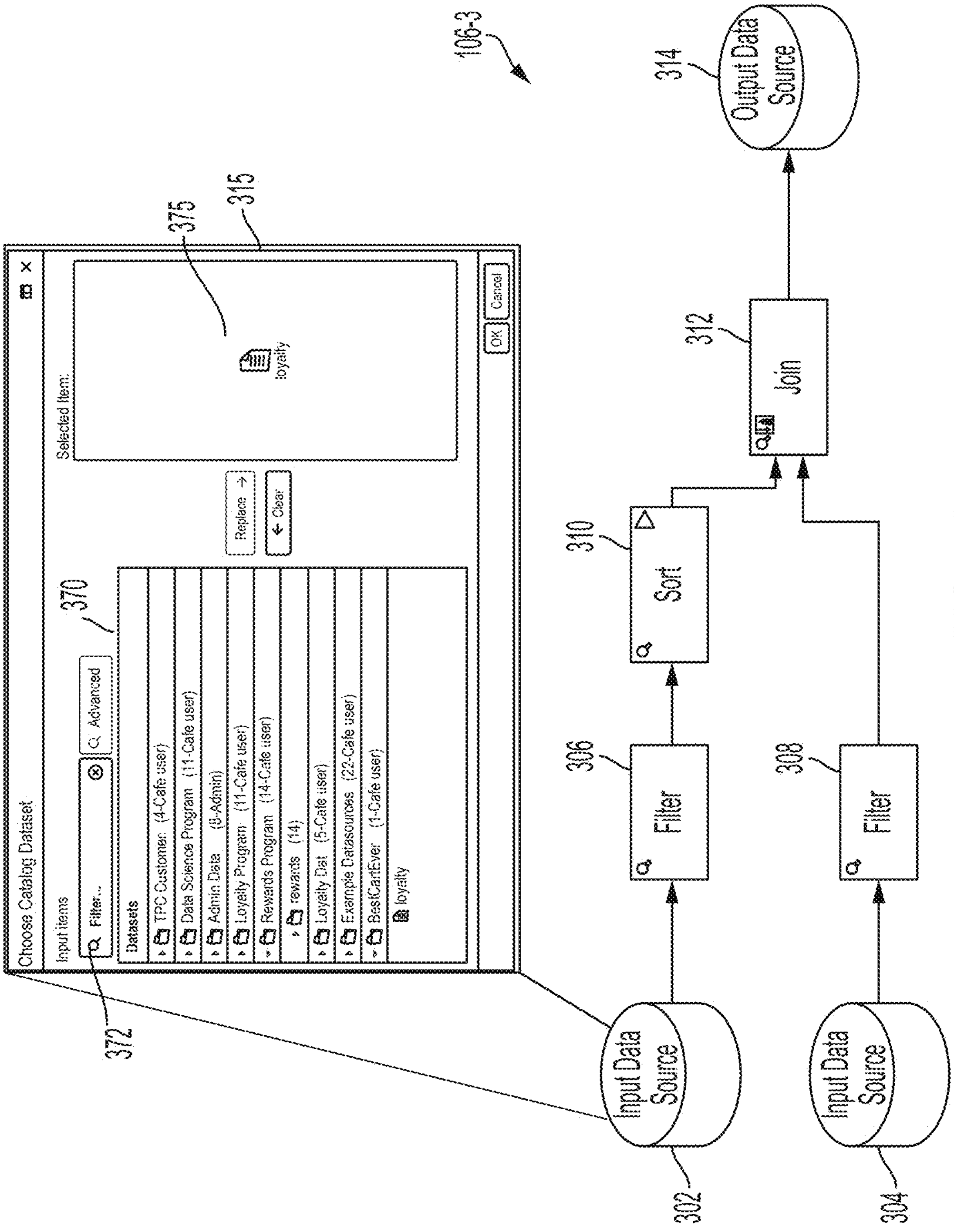
FIG. 3B is a schematic illustration of the dataflow graph of FIG. 3A, where an input node of the dataflow graph is configured or programmed in terms of a logical dataset.

FIG. 3B illustrates schematically how input node 302 of FIG. 3A is configured or programmed in terms a logical dataset. The input node 302 may be configured to represent a particular logical dataset that is specified via user input provided through the user interface. For example, user input may be provided via user interface 315. A listing 370 of logical datasets available for use in configuring the input and output nodes of the dataflow graph may be provided in the user interface 315. The logical datasets available for use in configuring the input and output nodes may be logical datasets for which entries exist in the catalog of datasets. The user may browse through the listing and select a particular logical dataset for configuring the input node 302, The user may input a search query via user interface element 372 where the user may specify one or more values of dimensions that describe the logical datasets or logical entities. Those dimensions may include words entered in the repository to describe the logical dataset or fields included within the logical dataset. FIG. 3B depicts that a "loyalty" logical dataset 375 is selected by the user and the input node 302 is configured to represent this selected logical dataset.

Co-pending application titled "Data Processing System with Manipulation of Logical Dataset Groups," assigned U.S. patent application Ser. No. 17/589,016, describes various search interfaces through which a user may search for a dataset and/or a group of datasets as a target of an operation. The interfaces and techniques described in this co-pending application may be used in a data processing system described herein for purposes of configuring components of an application.

The catalog of datasets may include an entry for this selected logical dataset that provides information for accessing the physical dataset corresponding to the selected logical dataset. The information may be or include a program for accessing the physical dataset. When execution of the application involves an operation on the selected logical dataset, the dataset multiplexer may utilize the appropriate data catalog information to provide access to the physical dataset. For example, an identifier associated with the selected logical dataset may be used to identify an appropriate entry in the catalog of datasets including the program and the program may be executed to access the physical dataset from a data store. The dataset multiplexer may expose a link to the program such that access to the physical dataset is achieved by execution of the program at that link.

Figure 3C:
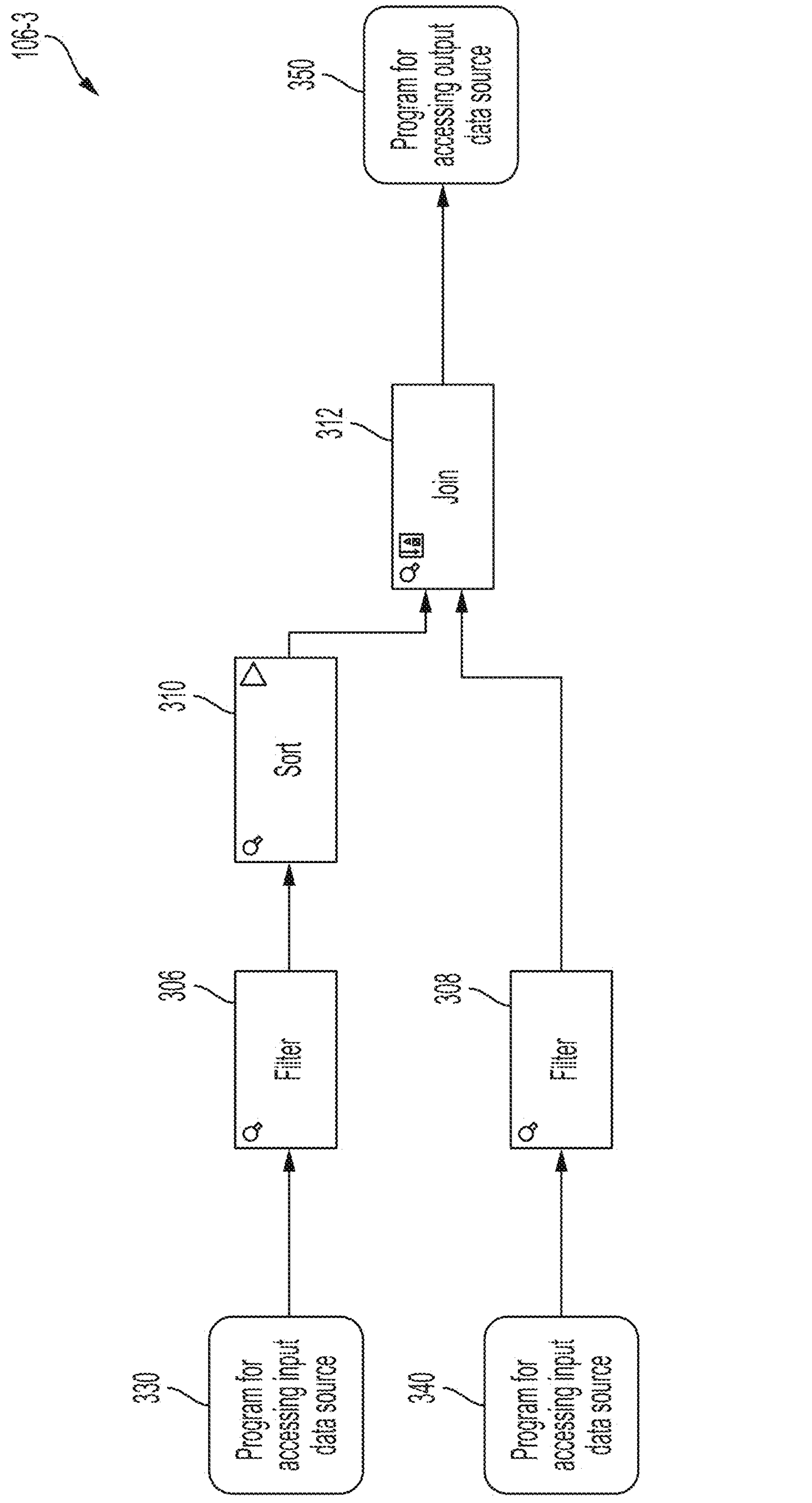
FIG. 3C is a schematic illustration of the data flow graph of FIG. 3A, modified to access information in a dataset catalog to enable access to a physical dataset for execution of operations in the application specifying access to a logical dataset.

FIG. 3C illustrates schematically how such a connection may be made using the catalog of datasets. This figure schematically illustrates application 106-3 as described above in connection with FIG. 3B. As shown in FIG. 3C, when the program is executed, the input nodes 302, 304 and output node 314 of FIG. 3B are replaced with programs that provide access to the physical datasets corresponding to the logical datasets for which those components were configured. For example, input nodes 302, 304 are replaced with programs 330, 340 that provide access to each of the physical datasets in the data stores in which they are currently stored. Also, output node 314 may be replaced with program 350 indicative of a program that provides access to each of the physical datasets to which data is written, in the data store in which it currently resides. These programs may also make conversions between the format of the logical datasets with which the application is programmed and the format of the storage of the physical dataset in the data store.

Representative Dataset Catalog

The catalog of datasets 107 may include multiple objects, where each object stores information associated with a logical dataset. In this context, an object refers to the collection of information stored in computer readable medium that captures information related to a logical dataset. That information may be stored in any suitable format. For example, that information may be stored in a block of contiguous computer memory, distributed across multiple locations in computer memory, stored in a single file or other data structure, distributed across multiple data structures, or otherwise stored in a way that enables information reflected in the object to be related to a logical dataset.

The object may be related to the logical dataset in any suitable way. An object may have a predefined format including information, which may be formatted as a header, that identifies the logical dataset and/or the physical dataset to which the information relates. However, that information may be formatted other than in a header. The catalog, for example, may store a list of pointers to objects, indexed by logical dataset identifiers, such that accessing a pointer with a particular logical dataset identifier as an index enables a computer accessing the catalog to find the object associated with that logical dataset as the target of the pointer. Alternatively or additionally, some or all of the catalog information about a logical dataset may be stored as an addendum to a repository of information that may otherwise exist within the data processing system. For example, a data processing system may include a repository of metadata related to logical and/or physical datasets. Catalog information may be appended to this repository and/or stored in a separate metadata repository.

Information about a logical dataset may be reflected in an object in any suitable form. For example, information may be stored as one or multiple descriptors, each having a value. Alternatively or additionally, information may be stored as or include computer executable instructions. In some embodiments, the physical dataset may be reflected in the object because a program stored with the object in order to access the physical dataset is hard coded to access that physical dataset. In other embodiments, information identifying the physical dataset corresponding to a logical dataset may be stored as a value of a field in a data structure storing an object. That value may be passed as a runtime parameter to a program stored with the object in order to access the physical dataset or otherwise used to access the physical dataset.

Figure 4:
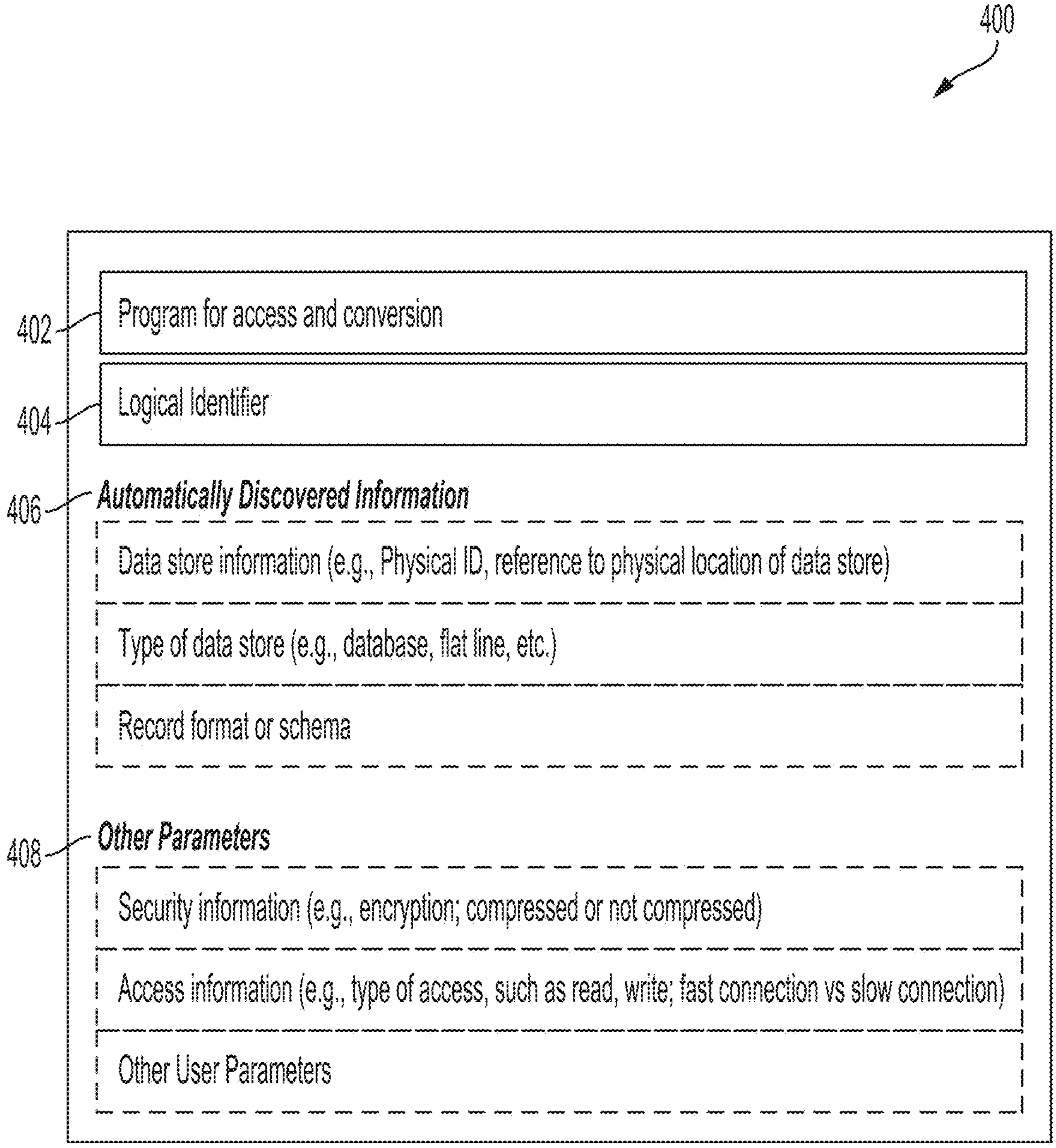
FIG. 4 is a schematic information of information that may be reflected in an object of a dataset catalog providing information about a physical dataset corresponding to a logical dataset.

FIG. 4 illustrates an example object 400 in a catalog of datasets 107 maintained by the dataset multiplexer 105. FIG. 4 shows various pieces of information captured in object 400, however, some of that information, such as discovered information 406 and/or access information 408, may be optional.

Information captured in an object 400 may include information for identifying a physical dataset corresponding to a logical dataset. In this example, the object is identified by an identifier 404 of the logical dataset.

The information reflected in object 400 may be or may include an executable program 402 for accessing the physical dataset. When executed, the program may access the physical dataset corresponding to the logical dataset and convert data in the physical dataset to a format of the logical dataset or vice versa. The program may be reflected in a catalog object by storing a copy of the computer-executable instructions of the program in computer memory allocated for that object. In other embodiments, the program may be stored elsewhere, with only a pointer to or other identifier of the program stored in the computer memory allocated for the object.

In some embodiments, the program may be created using discovered information 406 identified during a registration process of the physical dataset and/or access information 408 otherwise used to access the physical dataset.

The object may reflect information about the physical data source storing the corresponding physical dataset that enables access to and conversion of data in the physical dataset. That information may be obtained in any of a number of ways, including via user input or via an automated discovery process performed by reading data or metadata from the data source storing the physical dataset. In some embodiments, discovered information 406 may be automatically discovered as part of a registration process of the physical dataset with the dataset multiplexer 105. As part of the registration process, a user may specify a logical dataset to which a physical dataset corresponds, or the correspondence between a logical and physical dataset may be determined in another suitable way. The automatically discovered information may include a physical identifier associated with the data store and/or physical dataset, a reference to a storage location of the data store and/or physical dataset, a type of data store, a record format or schema of the physical dataset, and/or other information.

In some embodiments, a copy of this discovered information may be stored in the object. In other embodiments, the discovered information 406 may be reflected in the object because it is used to create the program to access the physical dataset, which is stored as part of the object. For example, a type and format information of the data store and/or physical dataset may be used to create the program with conversion logic to convert the data in the physical dataset to a format of the logical dataset.

Access information may include parameters 408, which may specify a manner in which to access the physical dataset and/or data store. In some embodiments, these parameters may be design-time and/or may be run-time parameters. Design-time parameters may be applied to specify functions of program 402. As the program is generated based on the design-time parameters, values of those parameters need not be separately stored in object 400. If runtime parameters, their values may be stored in the object and supplied as inputs to the program when executed.

Parameters 408 may include one or more parameters specifying a type of access to a physical dataset. In some embodiments, the type of access may indicate a read access or a write access. In other embodiments, the type of access may indicate the amount of bandwidth allocated for access of a particular logical dataset. For example, a value of a parameter 408 may indicate dedicated access or shared access. A data store may support a number of connections to applications 106 that can use in the aggregate no more than a predetermined amount of bandwidth accessing a data store. An allocation approach may be applied to enable applications that perform higher priority tasks than others to use more of the total available bandwidth for the data source. As a specific example, the data source may support dedicated access and shared access, with dedicated access for an application resulting in more of the available bandwidth allocated to an application than when shared access is provided. Specifying dedicated access to the logical datasets used by higher priority applications and shared access to the logical datasets used by lower priority applications may allocate available bandwidth at a data source as desired.

As another example, an access parameter alternatively or additionally may indicate a type of connection used to access the data store holding the physical dataset corresponding to the logical dataset, such as fast connection or a slow connection.

As yet a further example, parameters 408 may include one or more parameters specifying security-related information. In some embodiments, the one or more parameters may indicate whether the data in the physical dataset is encrypted. In embodiments in which the data is encrypted, the parameters 408 may include information such as a security key to decrypt that information, or otherwise make it usable. To enhance security, the security key may be provided by applications 106 at runtime and may not be stored in the catalog of datasets 107. In other embodiments, the one or more parameters may indicate whether the data in the physical dataset is compressed. In embodiments in which parameters 408 are used to create program 402, a value of a parameter 408 indicating that the data in the physical dataset is encrypted may be used to include decryption logic in the program.

As a further example, parameters 408 may include one or more parameters specifying criteria for a filter operation. For example, the one or more parameters may specify a date that may be used to filter information when accessing the physical dataset.

In some embodiments, some or all of the values of parameters 408 may be automatically discovered. This automatic discovery process may be performed when a physical dataset is registered with a component of the data processing system that creates a dataset catalog. During the discovery process, for example, a component of the data processing system may access metadata in a data store to determine information reflected in the object. Alternatively or additionally, a component of the data processing system may analyze data read from a physical dataset to recognize patterns in the data that indicate a record format, encryption, compression or other information about the physical datastore.

However, it should be appreciated that the discovered information 406 could be obtained other than with direct interaction with a data source, such as by reading from a repository of metadata relating to logical and/or physical datasets maintained by the data processing system. For example, security information, such as encryption or compression, may be applicable to all datasets within a data store. Once security information is stored anywhere in the system for one physical dataset in a data store, that security information may be reflected in objects used in accessing other physical datasets in the same data store.

Some or all of the information reflected in an object, even if indicated in the example of FIG. 4 as being discovered, may be input by a user. In other embodiments, some portion of the discovered information 406 and/or access information 408 may be specified by a user via the user interface as part of the registration process. However, it should be appreciated that user input may be supplied in other ways, such as when defining a logical dataset. As a specific example, priority of a logical dataset may be specified either when the logical dataset is defined or, after it is defined, by editing the metadata stored for that logical dataset.

Moreover, it should be appreciated that FIG. 4 shows an object, configured for access to a physical dataset, associated with a logical dataset at one moment in time. The data processing system may detect events that impact storage of data associated with a logical dataset. If so, the object for that logical dataset may be updated. For example, values of any of the parameters may be updated whenever a change to those parameters is detected. Alternatively or additionally, if a new physical dataset is registered, with input indicating that it is storing data for a logical dataset for which an object already exists in the catalog, the object for the logical dataset may be changed. A change may be implemented, for example, by wholly or partially overwriting the object with new information or replacing it with a new object to reflect the new physical dataset. The object for the logical dataset, however, may be accessed in the same way via the dataset catalog. In this way, once an application, written to perform data access operations based on a logical dataset, is configured to access the physical dataset corresponding the logical dataset via the dataset catalog, it will continue to correctly access the correct physical dataset despite any changes.

In some embodiments, program 402 may be configured as an executable dataflow graph that includes the logic for accessing a physical dataset. In embodiments in which applications are developed as graphs, as described above in connection with FIGS. 3A-3C, program 402 may be configured as a subgraph in the sense that it will be executed as part of a dataflow graph implementing an application. For example, FIG. 3C depicts a first program 330 configured as a subgraph that includes logic for accessing an input dataset, a second program 340 configured as a subgraph that includes logic for accessing an input dataset, and a third program 350 configured as a subgraph that includes logic for accessing an output dataset.

These subgraphs may be considered to be dynamic subgraphs (DSG) because the subgraphs are updated from time to time based on events that indicate changes to the appropriate mechanism for data access for the storage associated with a logical dataset. Therefore, use of the subgraph data access operations within the application, results in dynamically accessing the physical dataset that stores the correct data at that time. Accordingly, a DSG is used herein as an example of a program 402.

Representative Dataset Multiplexer with a Dataset Catalog

Figure 5A:
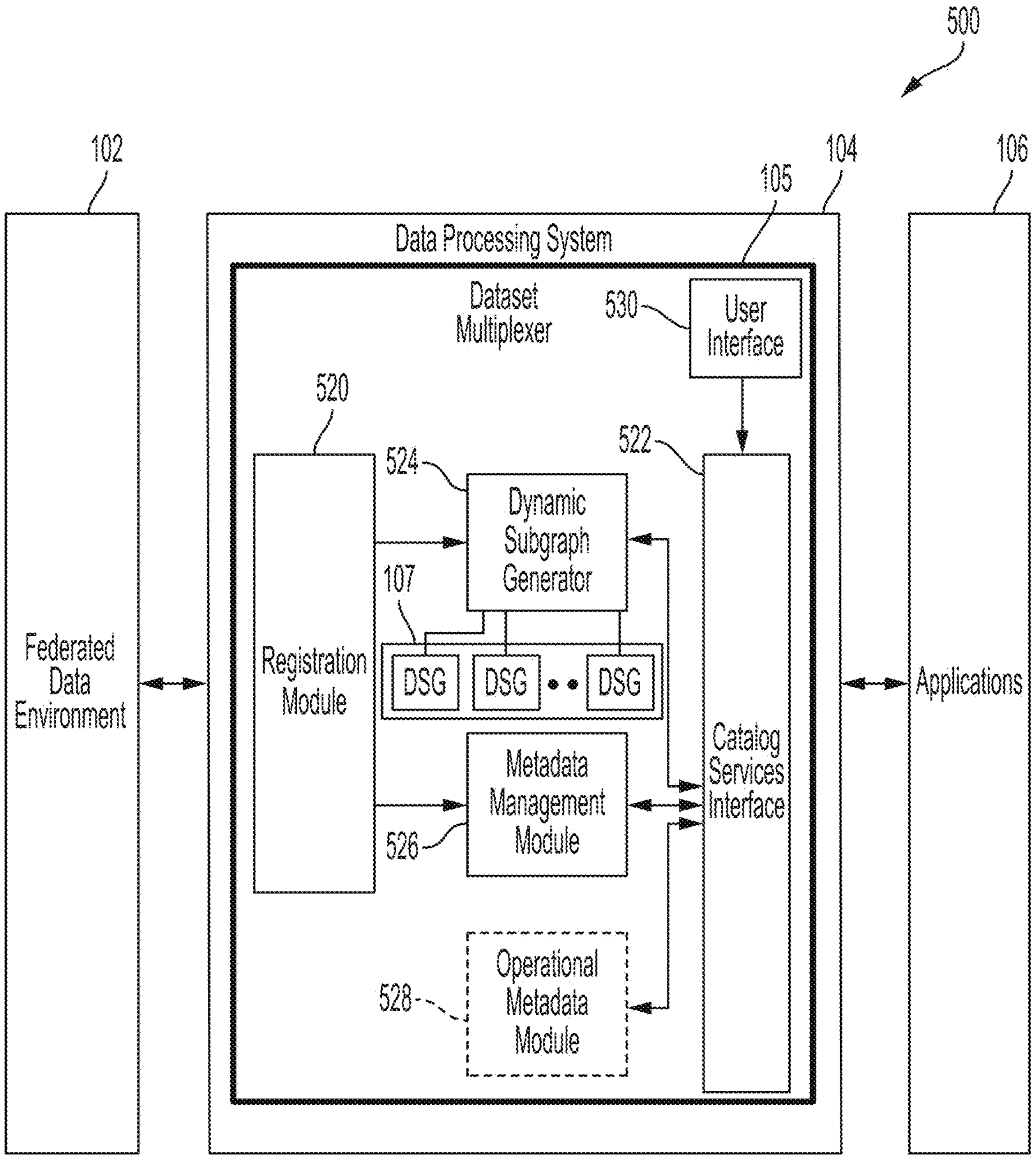
FIG. 5A is a block diagram of the exemplary enterprise IT system of FIG. 1A, showing additional details of a dataset multiplexer.

FIG. 5A is a block diagram highlighting components of dataset multiplexer 105 of data processing system 104. As shown in FIG. 5, dataset multiplexer 105 includes, among other components, registration module 520, dynamic subgraph (DSG) generator 524, metadata management module 526, operational metadata module 528, catalog services interface 522, and user interface 530.

In some embodiments, registration module 520 is configured to register physical datasets with the dataset multiplexer 105. Registration may be triggered by addition of physical datasets to an IT infrastructure or by use of the physical dataset from an application. Alternatively or additionally, registration module 520 may receive a command to register a physical dataset via user interface 530. For example, a user may provide input via user interface 530 to initiate the registration process of the physical dataset. That input may be in the form of a direct command to register a physical dataset.

Alternatively or additionally, that input may indirectly indicate that registration is to be initiated. For example, registration may be triggered when a user writing an application selects a logical dataset that has been associated with a physical dataset for which there is no information in the dataset catalog or for which information in the catalog is not up to date. Other actions, serving as indirect commands, may include an indication to migrate a physical dataset from one data store to another or a command to change the metadata associated with a logical dataset that might impact the conversion between a physical dataset and the logical dataset. Regardless of how the registration process is triggered, user input may specify a logical dataset corresponding to the physical dataset such that an object in the catalog for the logical dataset may be created or overwritten with up to date information.

Other information to create or update the object in a catalog may be gathered from one or more sources. Registration module 520 may discover information regarding the physical dataset and/or the data store in which it is stored during the registration process. Information gathered in this way may include the type of data store, record format or schema of the physical dataset, physical storage location of the data store, compression and/or encryption status, and/or other information.

Registration module 520 may provide the obtained information to DSG generator 524. DSG generator 524 may create a DSG based on the received information. DSG generator 524 may have access to a number of program templates, each program template corresponding to a particular type of data store. DSG generator 524 may detect a type of data store from the received information and select, from among the number of program templates, an appropriate program template corresponding to the detected type. For example, the data processing system may be pre-configured with templates for read and/or write access to data tables in an ORACLE database or in an HADOOP distributed database. Detecting the type of data store storing a physical dataset may enable DSG generator 524 to select an appropriate template for access to the physical dataset corresponding to the logical dataset for which the DSG is being created.

DSG generator 524 may generate a program based on the selected program template. DSG generator 524 may detect values for parameters of the selected program template from the received information and may populate the program template with the detected values. Some or all of the values of parameters may alternatively or additionally be obtained from metadata management module 526, which in this example may maintain metadata for the physical datasets, data stores and/or logical datasets. Parameters may alternatively or additionally be supplied via user input using the user interface 530 or obtained in other ways.

DSG generator 524 generates a DSG that includes access logic for accessing a physical dataset and conversion logic for converting between a format of the physical dataset and a format of the corresponding logical dataset. DSG generator 524 may generate a logical layer to physical layer mapping for the physical dataset and the corresponding logical dataset. DSG generator 524 may generate a mapping between one or more fields of a logical dataset and one or more fields of a physical dataset that represent the same information. This mapping may be generated with information from various sources, including information available within the data processing system, user input and/or information derived through semantic discovery. DSG generator 524 may utilize the mapping to generate the conversion logic. For example, a customer name in the physical dataset may be stored as three fields in a row of a data table, holding data corresponding to the customer's first name, middle initial and last name, respectively. The logical dataset, however, may simply include a logical entity Customer_Name. DSG generator 524 may generate a mapping between these three fields of the physical dataset and the logical entity of the logical dataset. The conversion logic may include logic that converts between the "customer's first name, middle initial and last name" format of the physical dataset to the "Customer_Name" format of the logical entity. When the DSG is executed, the access logic is executed to obtain information from the three fields of the physical dataset and the conversion logic is executed to convert between formats of the physical dataset and the logical dataset.

In some embodiments, DSG generator 524 creates a DSG for each of multiple physical datasets in a data store. The created DSGs may be included in the catalog of datasets 107. The catalog of datasets 107 may include objects associated with logical datasets, where each object may be or include a DSG for accessing a physical dataset corresponding to the logical dataset.

Registration module 520 also may provide discovered information to metadata management module 526 such that metadata management module 526 may receive and maintain metadata for the physical datasets and/or data stores. In some embodiments, metadata management module 526 may be a source of information for dynamic subgraph generator 524 when generating a DSG and may additionally store metadata about datasets, which may be used in other operations involving datasets within the data processing system. Metadata management module 526, for example, may maintain information, serving as metadata regarding a logical dataset, information about logical entities in the logical dataset, relationships among the logical entities of the dataset, and relationships with other logical datasets and/or entities of other logical datasets.

Metadata management module 526 also may store the mapping between the logical datasets and the physical datasets, which may be based on user input or, in some embodiments, derived such as by monitoring operations in which a user has directly or indirectly specified an association between a logical and a physical dataset as part of a data processing operation. Regardless of how acquired, in some embodiments, metadata management module 526 may maintain a table or other data structure mapping an identifier of a logical dataset to an identifier of a physical dataset corresponding to the logical dataset. This information may be used by dynamic subgraph generator 524 in creating an object representing a logical dataset and/or determining that storage of data associated with a logical dataset has changed such that a previously created object requires an update.

Metadata management module 526 may maintain a listing of logical datasets known to data processing system 104. When programming an application in terms of a logical dataset, the listing of known logical datasets may be presented to a user via a user interface of the application and the user may select a particular logical dataset from the presented listing. This logical information maintained by the metadata management module 526 may be used, for example, to enable a user to search for a specific logical dataset for use in writing an application. Information about physical datasets, including correspondence to a logical dataset, which may also be stored by metadata management module 526, may also be used in searching for an appropriate dataset. For example, this logical and physical information may be used to define dimensions of a faceted search for a dataset.

A data processing system may maintain other types of metadata about datasets, which may also be available for a user searching for a dataset for a particular scenario. For example, metadata relating to use of datasets may be captured and stored when datasets are used. This operational metadata may also be used by a dataset search tool to enable a user to search for datasets based on their usage by others.

Operational metadata module 528 may collect operational metadata regarding the datasets. The operational metadata may be collected during or after execution of an application or other program that accesses a dataset. The operational metadata collected during execution may include identifying information regarding physical datasets accessed, the date and time of access, whether the dataset was updated, values of parameters associated with execution of one or more subgraphs that accessed the datasets, and/or other operational data. Operational metadata collected or determined after execution may include information regarding frequency of access of datasets, whether physical or logical, information regarding recency of access, or information regarding the size of data accessed (e.g., number of records that were read from and/or written to). Some operational metadata may be social information, such as information regarding users that created or accessed the datasets. This social information may include a role of users in the enterprise, permissions provided to the users, and/or other information about people in an enterprise.

In the example of FIG. 5A, catalog services interface 522 integrates access to the various types of metadata about datasets. It may provide, for example, a faceted search tool that enables searching on any of a number of facets that may exist in any of the logical, physical and/or operational metadata that may be stored about physical and/or logical datasets that a user may wish to select when writing an application or otherwise specifying operations to be performed on a dataset. Facets in the search may be based on the information about the logical datasets, physical datasets, and/or operational metadata stored within the data processing system. For example, a search for a dataset may be qualified to return only datasets for which there is an entry/object in the dataset catalog. This facet may be combined with other facets relating to logical or physical datasets to provide a powerful search interface. For example, the search query can be qualified to return only datasets accessed within the past week and only those logical datasets with an e-mail field for which a corresponding physical dataset is stored in a data store with high speed access.

Though FIG. 5A shows separate modules managing different types of metadata, it should be appreciated that this depiction is segregated by function and that the hardware and/or software components that capture and/or provide multiple types of metadata may be partitioned in other ways, including integrating the capture and management of all such metadata in a single module or in more modules than are illustrated.

Catalog services interface 522 also enables applications 106 to be programmed in terms of logical datasets. Once a user selects a logical dataset for programming an application, catalog services interface 522 may provide information that enables applications written in terms of that logical dataset to access the appropriate physical dataset. Catalog services interface 522 may access catalog of datasets 107, with each object in the catalog corresponding to a logical dataset and providing information for accessing a physical dataset corresponding to the logical dataset. A catalog object may be or include a program, in this example shown as a DSG, for accessing a physical dataset corresponding to the logical dataset.

Catalog services interface 522 may enable an application to access the physical dataset by providing information about the program in the object for the selected logical dataset in the catalog of datasets 107. Upon execution of an operation to access a logical dataset from within an application, the application may use that information to access the corresponding physical dataset in a data store. In this way, the program identified from the catalog object may be executed to access the physical dataset from the data store. For example, catalog services interface 522 may expose a link to the DSG, which a development environment in which the application is being developed can use to structure the application such that access to a physical dataset is achieved by execution of the DSG at that link at the time of execution of the application. In some embodiments, catalog services interface 522 provides this link via an Application Programming Interface (API).

As described above a catalog object associated with a logical dataset, and therefore the DSG in that object, may be updated in response to events indicating changes to storage of information associated with a logical dataset. For example, a physical dataset corresponding to the logical dataset may be migrated from one data store to another. The catalog object for the logical dataset may be updated to account for this change. In some embodiments, a program for accessing the physical dataset may be modified such that an application accesses the physical dataset from the correct data store. By updating the catalog object for the logical dataset, applications written to access the logical dataset continue to operate without modification even when the physical dataset migrates from one data store or another. Such dynamic updating is described in more detail with respect to FIGS. 6A-6B below.

Other events, which need not be tied to the location of the physical dataset, may result in changes to the objects in the dataset catalog. For example, in response to an event indicating a change to a format of a physical dataset, the appropriate catalog object may be updated. For example, if the format of the physical dataset is changed by adding fields to the dataset, the corresponding catalog object may be updated to account for the added fields. In some embodiments, the conversion logic in a program for accessing the physical dataset may be modified to account for this change. As another example, in response to an event indicating a change to values of parameters used to generate the program or accessed in the program, the values of the parameters stored in the catalog object may be updated and/or the program may be re-generated with the new values. As yet another example, an event indicating a change associated with a physical dataset corresponding to a logical dataset may include an event indicating a replacement of the physical dataset with another physical dataset that corresponds to the same logical dataset. In this example, a catalog object corresponding to the first physical dataset may be replaced or substituted with a catalog object corresponding to the other physical dataset. These changes may be implemented by dynamic subgraph generator 524, which may be triggered to update the catalog object upon detection of an event. The update may be implemented, for example, by wholly or partially overwriting the memory locations storing the catalog object or by associating an object stored in other memory locations with the dataset catalog entry such that the catalog object for a particular catalog entry is updated when it is replaced by a new object. A trigger for such changes may be supplied by user input or may be automatically detected by dynamic subgraph generator 524, catalog services interface 522 or other component of the data processing system.

Figure 5B:
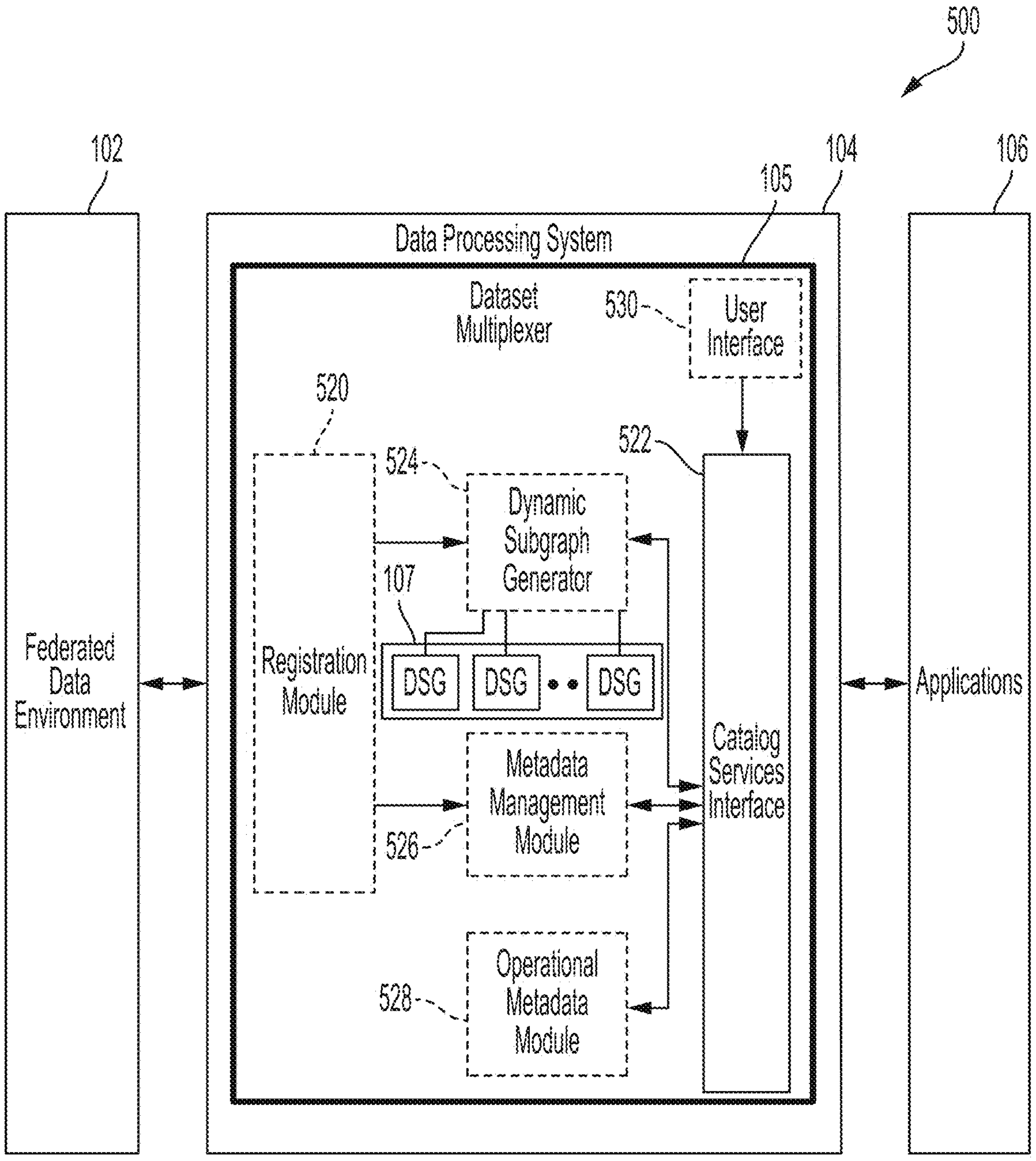
FIG. 5B is a block diagram of the exemplary IT system of FIG. 1A, showing components of a data multiplexer that may be optionally used when interfacing with an executing application.

It will be appreciated that when an application written in terms of a logical dataset is executed and the dataset catalog 107 is accessed to provide the application with access to a physical dataset corresponding to the logical dataset, one or more components, such as registration module 520, dynamic subgraph generator 524, metadata management module 526, operational metadata module 528, and/or user interface 530, may be optional as shown in FIG. 5B. Upon execution of an operation to access a logical dataset from within an application, the application may, based on the identifier associated with the logical dataset, obtain information about the DSG associated with the logical dataset from the data catalog 107 via the catalog services interface 522. In some embodiments, the catalog services interface 522 may provide this information to the application by exposing a link to the DSG. The DSG when executed provides the application with access to the physical dataset corresponding to the logical dataset.

Representative Techniques for Updating a Dataset Catalog Object

Figure 6A:
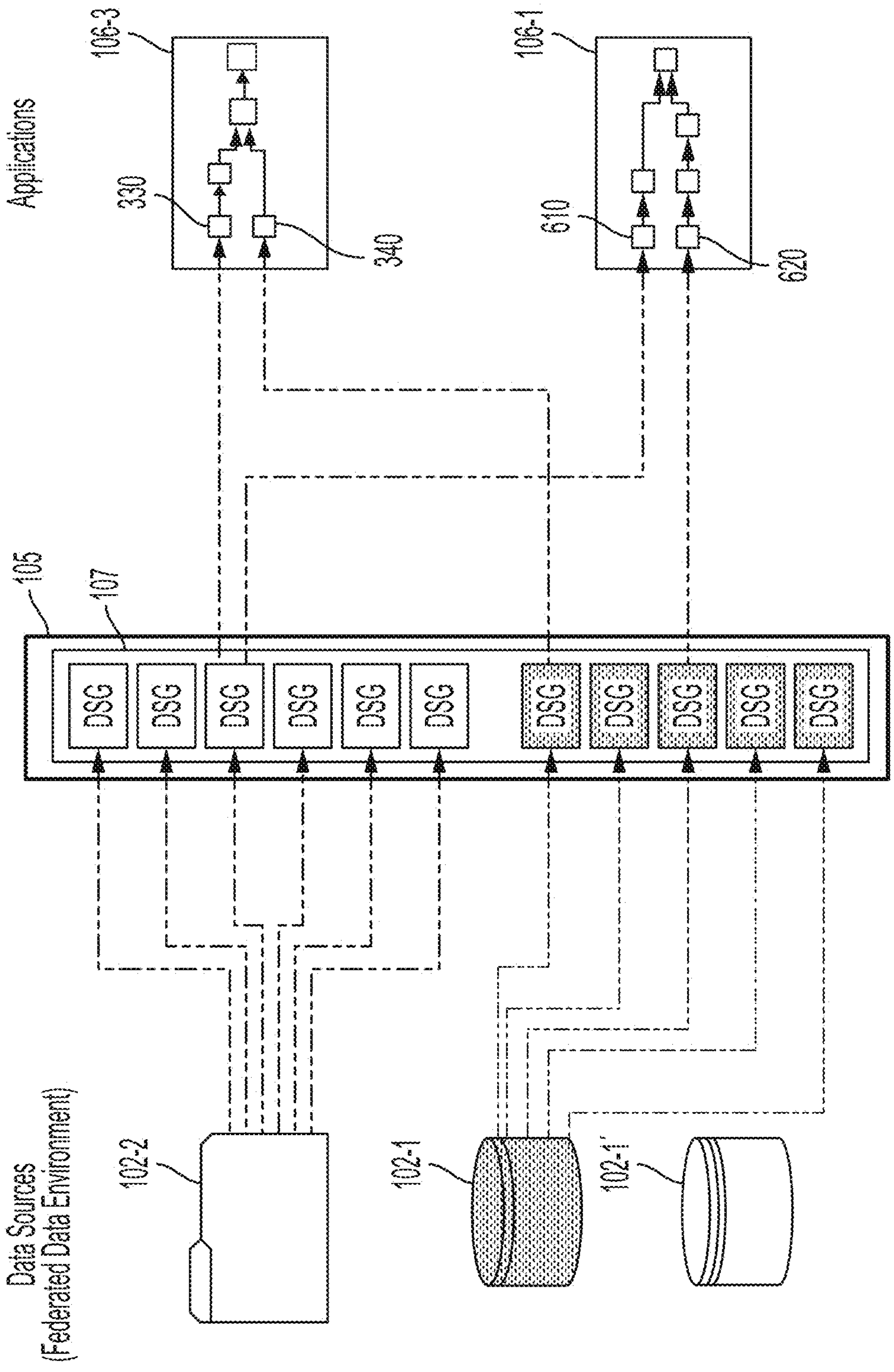
FIG. 6A is a block diagram of an exemplary enterprise IT system, such as is depicted in FIG. 1A or FIG. 5A, in a first operating state at a first time.
Figure 6B:
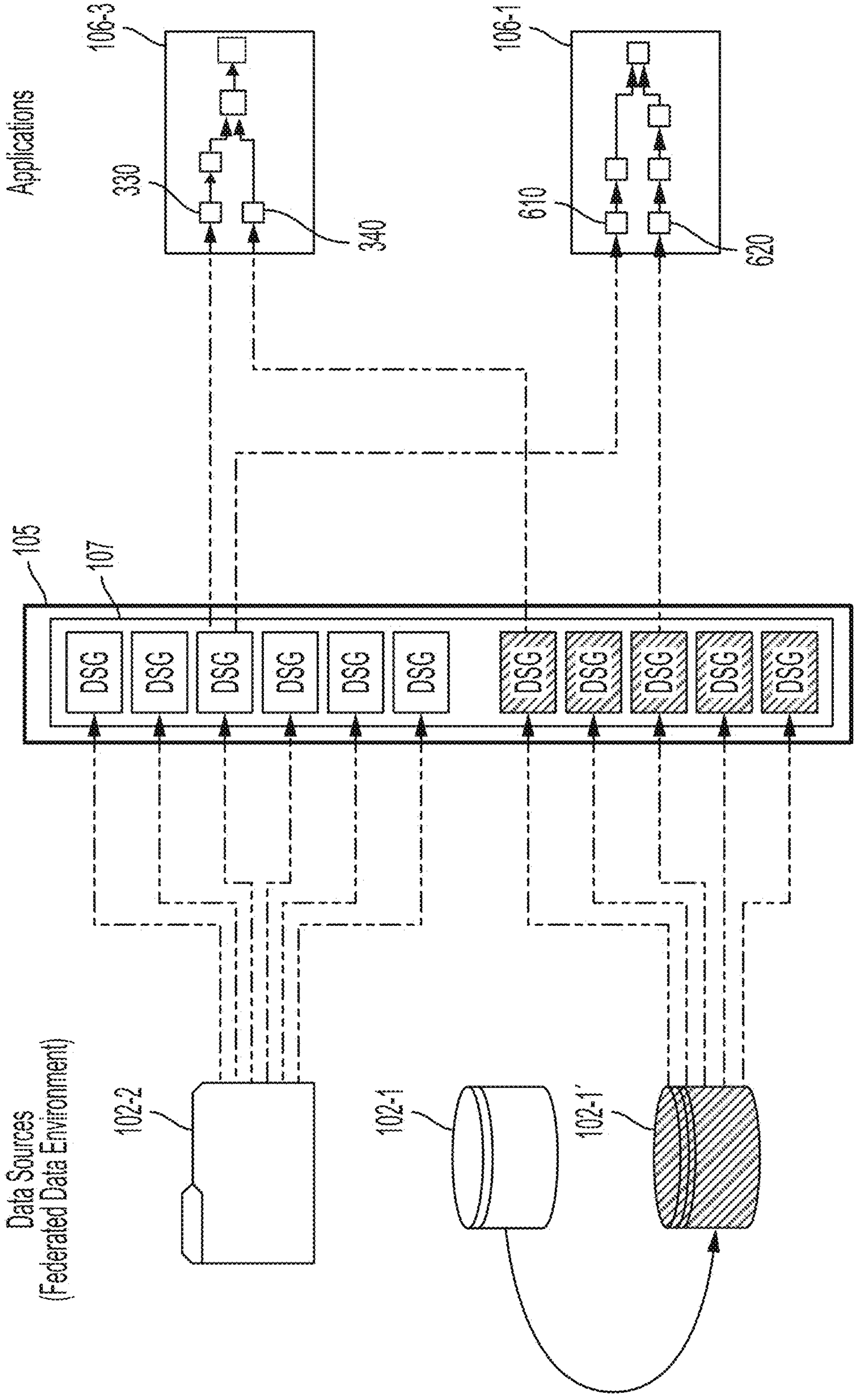
FIG. 6B is a block diagram of the exemplary enterprise IT system of FIG. 6A in a second state at a second time.

An object in a data catalog may be used to perform data access operations in an application that has been programmed in terms of a logical dataset. That catalog object may be updated in response to events such that, by using the current information in the object at the time of execution of the application, appropriate data access is provided. One such event is the change in storage location of the physical dataset, as shown in FIGS. 6A and 6B. FIG. 6A is a block diagram of the exemplary enterprise IT system, such as is illustrated in FIG. 1A or FIG. 5A in an operating state at a first time during which the data processing system facilitates access between application 106-1, 106-3 and data stores 102-1 and 102-2.

Application 106-3 may be developed as a dataflow graph in a development environment that implements references to a logical dataset in a specification of the application with information from a dataset catalog. Components 330 and 340 of application 106-3 representing input nodes of the dataflow graph may be programmed in terms of logical datasets, where information stored in computer memory for execution of the application includes, for those components, links to catalog objects corresponding to the logical datasets. For example, component 330 may be linked to a catalog object corresponding to a first logical dataset and component 340 may be linked to a catalog object corresponding to a second logical dataset. The links may be stored in any format conveying information sufficient to identify information in the object needed to access the physical dataset corresponding to the logical dataset referenced in those components. A link, for example, may be stored as an identifier of the object or a path through a directory structure to a file storing a program to access the physical dataset.

Application 106-1 may also be developed as a dataflow graph. Components 610 and 620 of application 106-1 representing input nodes of the dataflow graph may be programmed in terms of logical datasets, where the components are linked to catalog objects corresponding to the logical datasets. For example, component 610 may be linked to a catalog object corresponding to a first logical dataset and component 620 may be linked to a catalog object corresponding to a third logical dataset.

As shown in FIG. 6A, component 330 of application 106-3 and component 610 of application 106-1 may be programmed in terms of the same logical dataset and may be linked to the same catalog object in a catalog of datasets 107.

Data processing system 104 may maintain the catalog of datasets 107 including catalog objects corresponding to logical datasets. Each catalog object may be or include a DSG for accessing a physical dataset corresponding to the logical dataset. As shown in FIG. 6A, the catalog of datasets includes a first set of DSGs, each DSG in the first set programmed to access a physical dataset from data source 102-2. The catalog of datasets 107 also includes a second set of DSGs, each DSG in the second set programmed to access a physical dataset from data source 102-1.

Data processing system 104 enables applications 106-3 and 106-1 to access physical datasets from data stores 102-2 and 102-1 based on the respective programmed logical datasets using the information in the catalog of datasets 107. When programming application 106-3, a user may select a first logical dataset, such as from a listing of known logical datasets, and associate that logical dataset with component 330 and a second logical dataset to associate with component 340. Similarly, when programming application 106-1, a user may select a first logical dataset to associate with component 610 and a third logical dataset to associate with component 620.

Upon execution of an operation to access a logical dataset associated with component 330, the data processing system 104 may select a DSG linked to component 330. Upon execution of an operation to access a logical dataset associated with component 340, the data processing system 104 may select a DSG linked to component 340. Upon execution of an operation to access a logical dataset associated with component 610, the data processing system 104 may select a DSG linked to component 610. Upon execution of an operation to access a logical dataset associated with component 620, the data processing system 104 may select a DSG linked to component 620.

FIG. 6B is a block diagram of the exemplary data processing system of FIG. 1A or FIG. 5A in an operating state at a second time during which the data processing system facilitates access between application 106-1, 106-3 and data stores 102-1 and 102-1' when physical datasets of data store 102-1 have been migrated to data store 102-1'.

Migration of physical datasets from data store 102-1 to data store 102-1' in this example is an event that causes data processing system 104 to update the catalog of datasets 107. Objects in the catalog of datasets 107 that correspond to logical datasets mapped to physical data sets in data store 102-1 may be updated to account for the change in data stores. With this update, the second set of DSGs may be modified to access physical datasets from data store 102-1' instead of data store 102-1. As shown in FIG. 6B, the links between applications 106-3, 106-1 and the catalog of datasets 107 remains unchanged, and the applications 106-3, 106-1 continue to operate regardless of the change to physical storage of datasets. Execution of operations within the application that specify access of a logical dataset nonetheless results in access to the physical datasets in their updated location.

Figure 7:
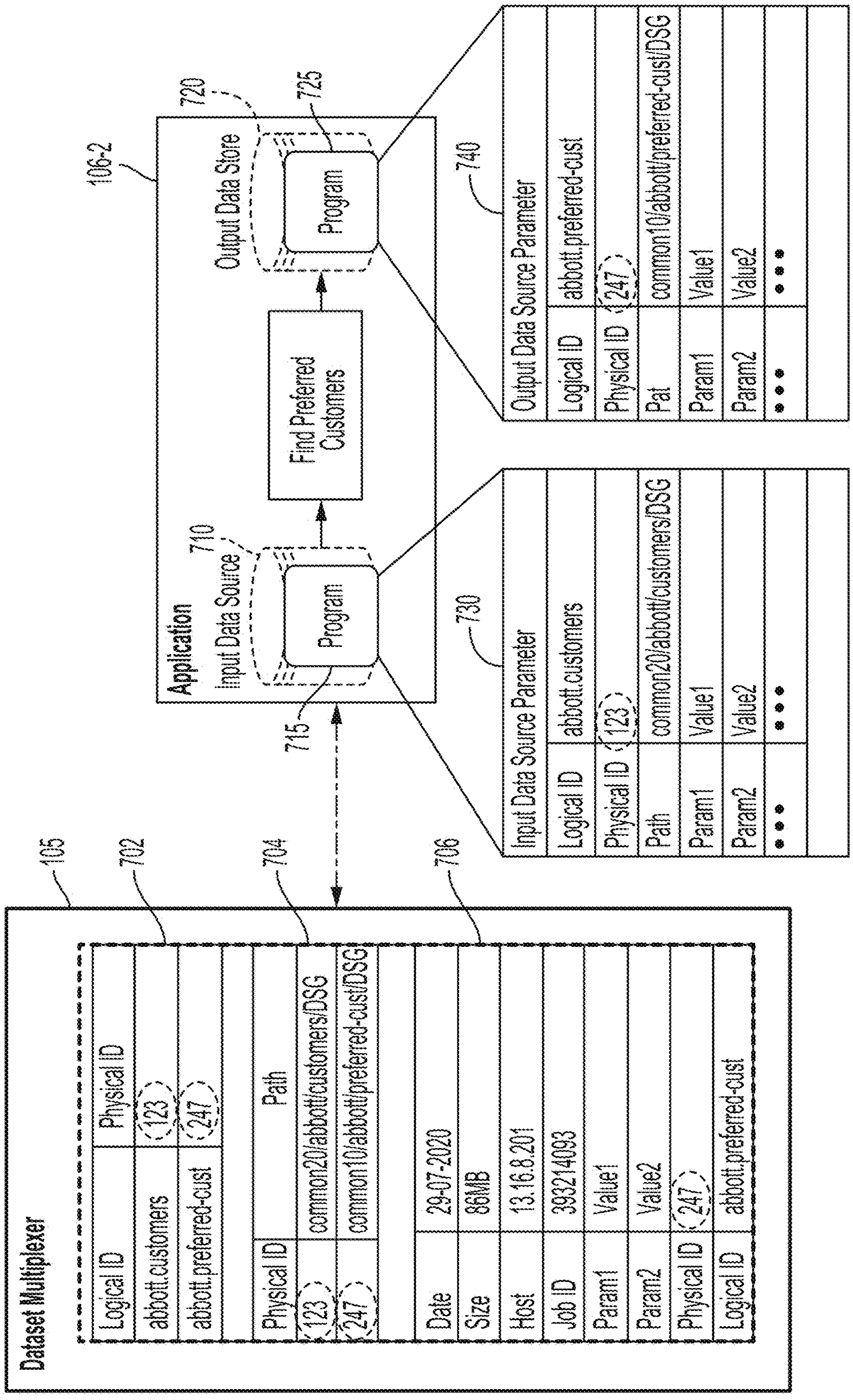
FIG. 7 is a block diagram illustrating information used in a data processing system configured with a dataset multiplexer according to some aspects of the technology described herein.

Representative Application Configured for Data Access Via a Dataset Catalog Object FIG. 7 is a block diagram illustrating various pieces of information maintained by the dataset multiplexer 105. This information may enable application 106-2 to be configured to access a physical dataset based on a programmed logical dataset. This information also may be recorded as a result of execution of the application once it has been configured. This recorded information may provide operational metadata for other functions performed by the data processing system, including providing a search interface through which users may later search for datasets to use in applications based on prior operations on datasets.

In this example, application 106-2 has been written to read data from a dataset that contains information about customers. It then extracts records from that dataset representing preferred customers and writes the results to a second dataset. When executed, application 106-2 will read from and write to physical datasets. However, application 106-2 may be programmed in terms of a first logical dataset associated with an input data store 710 and a second logical dataset associated with an output data store 720.

As application 106-2 is being written, a user may provide configuration inputs for input datastore 710 that specify a logical dataset from which data is to be read. In this example, the logical dataset is identified as "abbott.customers." That dataset may be selected by user input, such as selecting from a list of all logical datasets registered with the data processing system or selecting from a limited list returned in response to a user query for datasets with user specified parameters. Such a selection interface may be provided by the development environment for application 106-2.

Similarly, output datastore 720 may be configured with a logical dataset. In this example, the logical dataset has been identified as "abbott.preferred-cust."

To enable the application to execute, the development environment may relate the selected logical datasets to information that enables read and write operations to be performed on the physical datasets corresponding to the specified logical datasets at the time the application is executed. This may be done, for example, by obtaining information through catalog services interface 522 (FIG. 5A). Catalog services interface 522 may provide, such as in response to a request for catalog information relating to a logical dataset, information about a program which is maintained so that, when the program is executed, it accesses the physical dataset corresponding at that time to a particular logical dataset. In this example, information about the program is provided as a path within a directory structure to a file storing the program. In this example, the link to the program to access the physical dataset corresponding to input logical dataset "abbott.customers" is stored at the path "common20/abbott/customers/DSG." However, a link to the program may be supplied in any suitable format.

Similarly, the program for access to the physical dataset corresponding to the output logical dataset "abbott.preferred-cust" is obtained. In this example, that path is "common10/abbott/preferred-cust/DSG". These links to programs that can access physical datasets may be exposed by the catalog services interface 522 during execution of the application. These links may be stored as part of the computer-executable representation of the application such that, upon execution of operations within the application that access these datasets, the programs can be executed. Alternatively, information sufficient to execute the programs to access the physical dataset may be obtained at any time prior to execution of an operation to access a data source, including at the time of execution of the application.

Regardless of when, in relation to the execution of application, information about a program to provide access to a physical dataset is identified, dataset multiplexer 105 may provide information about that program. FIG. 7 illustrates that dataset multiplexer 105 maintains information sufficient to relate a logical dataset to a program to access a physical dataset corresponding to that logical dataset. This information may be stored as a dataset catalog object for the logical dataset, for example. In some embodiments, this information may be fetched or provided by the dataset multiplexer 105 at run-time or design/build time of the application. Doing so at design/build time may avoid adding time expense and/or dependency to run-time operation.

In the example of FIG. 7, the information is shown stored as two relationships. A physical identifier of the physical dataset is used as a key to tie information 702, 704, and 706 together. First, information 702 provides information linking each logical dataset, by a logical ID used for that logical dataset to an identifier of the physical dataset currently storing the data corresponding to that logical dataset. Second, information 704 provides a relationship between the physical dataset and a program that may be used to access it.

In the example of FIG. 7, information 702 links logical dataset "abbott.customers" to a physical dataset, identified by identifier "123". The program at path "common20/abbott/customers/DSG" is related to the physical dataset with identifier "123" via information 704.

Likewise, logical dataset "abbott.preferred-cust" is related to physical dataset ID "247" through information 702. And, the program at path "common10/abbott/preferred-cust/DSG" is related to physical dataset 247 through information 704.

Similar information may be maintained by dataset multiplexer, such as in dataset catalog objects, for each logical dataset for which a corresponding physical dataset has been registered. Alternatively or additionally, some or all of this information may be maintained by metadata management module 526 or other module within the data processing system. Regardless of how the information is maintained, dataset multiplexer 105 may provide information about a program to access a physical dataset corresponding to a logical data set.

In the example of FIG. 7, the identified program at path "common20/abbott/customers/DSG", along with information used to invoke it, is stored as DSG 715 in the place of the specified input data store 710. DSG 715 may be referred to as a "read DSG" that reads data from the physical dataset corresponding to the input logical dataset "abbott.customers". Likewise, the program at path "common10/abbott/preferred-cust/DSG", along with information used to invoke it, is stored as DSG 725 in the place of the specified output data store 720. DSG 725 may be referred to as a "write DSG" that writes data to the physical dataset corresponding to the output logical dataset "abbott.preferred-cust".

The information indicating a program to be executed within an application may be stored in conjunction with the program instructions that make up the application. In a scenario in which the application is written as a dataflow graph and the programs to access data sources are written as subgraphs, these subgraphs may be dynamically linked into the dataflow graph at appropriate locations in the dataflow graph for execution. The locations may correspond to the input and/or output nodes of the dataflow graph. During or just prior to execution of the dataflow graph, the link or path information for the subgraphs exposed by or obtained from the catalog services interface 522 may be provided to the input and/or output nodes and the corresponding subgraphs may be linked and/or stored in place of the input and/or output nodes. An example technique for dynamically linking subgraphs into a dataflow graph via a sub-graph interface as described in U.S. Pat. No. 10,180,821, entitled Managing Interfaces for Sub-Graphs, which is incorporated herein in its entirety, may be used. However, other methods of storing information to execute the program may alternatively or additionally be used.

When application 106-2 is executed and an operation to access a logical dataset associated with the input data store 710 is encountered, the linked DSG 715 may be invoked. Invoking DSG 715 may result in its access logic and the conversion logic to be executed. Upon execution, the input data store 710 may be accessed and data from the input data store and/or a corresponding physical dataset of the input data store may be read and converted to a format of the logical dataset. Invoking a DSG may entail providing parameters to a controller module (not shown) within the data processing system.

In the example of FIG. 7, the parameters supplied for execution of DSG 715 are shown as parameters 730. In this example, one of the parameters 730 identify the DSG, such as by providing its path. The value of this parameter may be stored at the time the input data source 710 is configured for a specific logical dataset.

Others of the parameters 730 may be provided such that they can be supplied by the controller module to the DSG 715 for execution. These run-time parameters (i.e., supplied at run-time) may impact execution of the DSG. For example, values for parameters "Param1" and "Param2" may be supplied at run-time to the DSG. The value of one such parameter may specify, for example, that the DSG 715 should be executed in a specific read mode (single record, batch, quick, shared, etc.). Values of parameters may reflect an access priority for the application, as another example.

Values for these run-time parameters may be obtained in one or more ways. For example, they may be encoded in the application 106-2 based on input provided by a user at the time the application was developed. For example, values of parameters may be derived from information input as configuration parameters for input data source 710 in the development environment. As another example, values of parameters alternatively or additionally may be derived from other user inputs during development of the application or in response to prompts at the time of execution. As yet another example, the application may identify the values of parameters during run-time from various inputs, such as external inputs indicating a time of day, current system load, or other inputs that depend on the data provided as input to the dataflow graph.

As yet another example, values of parameters alternatively or additionally may be obtained from other modules. As a specific example, the values of at least some of the parameters 730 may be read from or obtained by processing information in a metadata repository storing information about the logical dataset associated with input data store 710. As yet another example, values of at least some of the parameters 730 may be read from or obtained by processing information in an access control module that maintains information about users, and may reflect an access priority or mechanism to a data store that is set based on the role of the user who developed the application or who is executing the application.

Values of other parameters in input data source parameter 730 may be included such that the controller module, or other component of the data processing system, may capture operational metadata. For example, the logical identifier of the dataset for which access is encoded may be stored for this reason, for example. Likewise, the identifier of the physical dataset being accessed may be stored. The value of this parameter may be supplied by the dataset multiplexer, such as from information 702 that is current at execution time. Capturing such information may enable an operational metadata module 528 (FIG. 5A), for example, to supply information to support additional facets of a search for a data.

In the example of FIG. 7, dataset multiplexer 105 is shown to store information 706 that is collected during execution of application 106-2. For example, information 706 may include the date on which the dataset was accessed, the size of the dataset at the time it was accessed and/or the amount of data read to or written from the dataset, a host ID of computer hardware involved in data access such as by executing the application or access program or physically storing the data. Other portions of information 706 may indicate the logical dataset associated with the output data store 720, the physical dataset accessed, values of parameters such as "Param1" and "Param2" supplied to program, when the physical dataset was accessed, and/or other information. Such an entry may be stored for each access to a dataset or for some number of prior accesses to a dataset or for a predetermined time after access to a dataset. This information may be analyzed after execution to determine other operational parameters, such as frequency or recency/freshness of use of the dataset.

Similar information may be stored for output data store 720. Upon execution of an operation to access a logical dataset associated with the output data store 720, a linked DSG 725 may be invoked. Invoking DSG 725 may result in its access logic and the conversion logic to be executed. Upon execution, the output data store 720 may be accessed and data may be written to the output data store after converting from a format of the logical dataset to a format of the output data store and/or format of a corresponding physical dataset of the output data store. Parameters 740 represent parameters whose values are supplied to the controller module and may be utilized by DSG 725 during execution. Though not shown in FIG. 7, an entry in the repository of operational metadata may similarly be made based on access of a physical dataset corresponding to output data store 720.

Representative Method of Registering a Data Set with a Dataset Catalog

Figure 8:
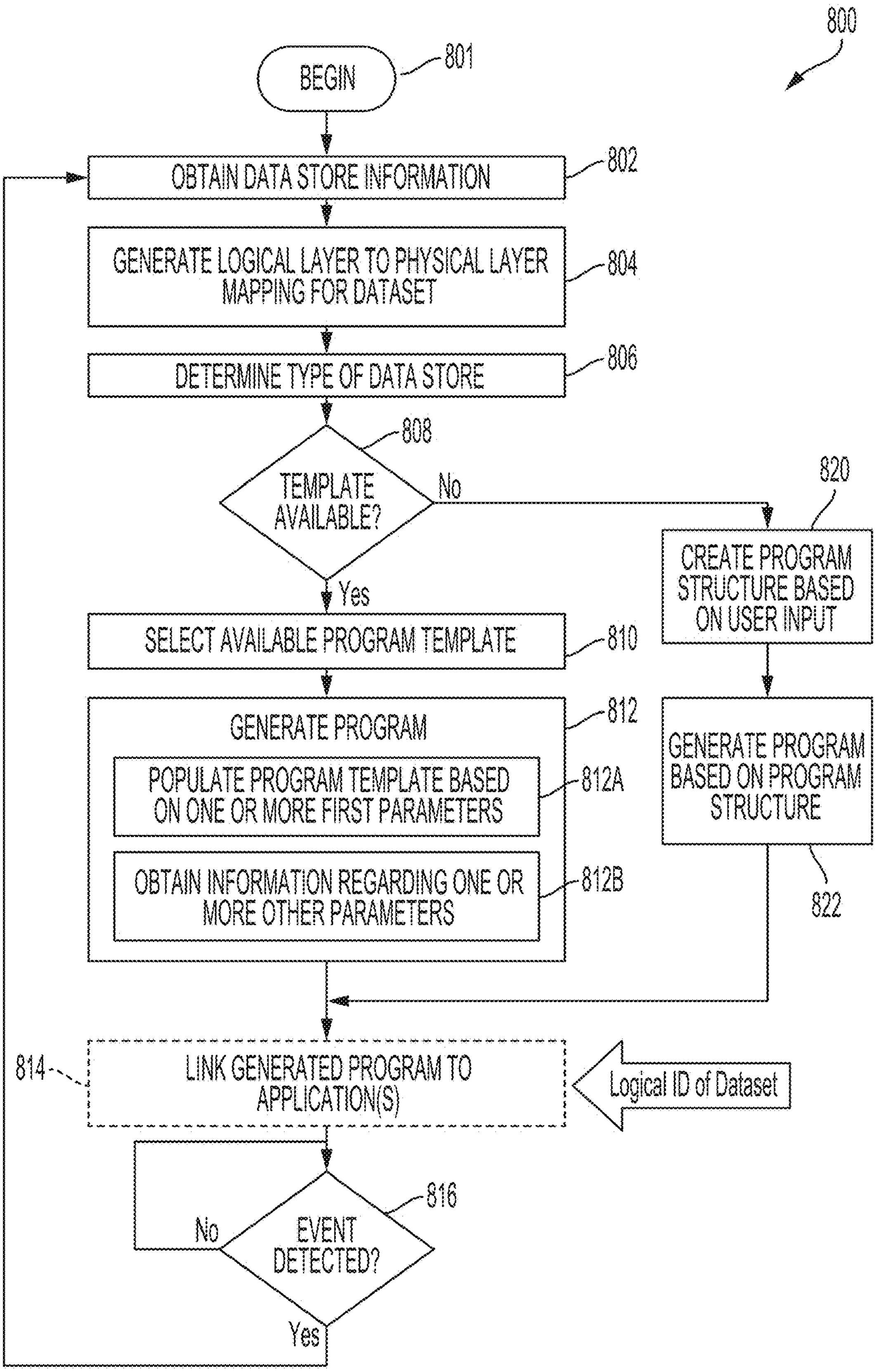
FIG. 8 is a flowchart of an exemplary method of operating a data processing system with a dataset multiplexer according to an aspect of the technology described herein.

FIG. 8 is a flowchart of an illustrative process 800 for registering a physical dataset with a dataset catalog, such that the physical dataset may be accessed from applications configured for access to logical datasets corresponding to the physical dataset. Process 800 may be executed by data processing system 104, such as in dataset multiplexer 105 described with reference to FIGS. 1A-IC. Process 800 may alternatively or additionally include other acts, including acts as described elsewhere herein in connection with other embodiments.

Process 800 may begin 801 in response to a detected event. The event may be an indication that there is no catalog entry in a dataset catalog that provides an access mechanism to a physical dataset in an IT system that corresponds to a logical dataset defined in the data processing system. The detected event may be an automatic detection of a physical dataset existing in the IT system which does not yet have a catalog entry. Such an indication, for example, may be in the form of user input, such as a user-entered command for the data processing system to register a physical dataset as corresponding to a logical dataset. Alternatively, the event may be an indication that a catalog entry in a dataset catalog that provides an access mechanism to a physical dataset in an IT system is out of date. However, other events, including other events described herein, may trigger execution of process 800. For example, a new physical dataset may be identified in a data store as part of running a periodic (weekly, biweekly, etc.) import feed. This identification may trigger the execution of process 800.

Process 800 may proceed to act 802, during which information regarding a physical dataset stored in a data store is obtained. The physical dataset may be the physical dataset referred to in context of the above beginning 801 of process 800. In some embodiments, some of the information may be automatically discovered, such as a physical identifier associated with the data store and/or physical dataset, a reference to a storage location of the data store and/or physical dataset, a type of data store, a record format or schema of the data store and/or physical dataset, and/or other information (such as information described in context of FIG. 4).

At act 804, a logical layer to physical layer mapping may be generated for the physical dataset and the corresponding logical dataset. In some embodiments, dataset multiplexer 105 may generate a mapping between one or more fields of a logical dataset and one or more fields of a physical dataset that represent the same information. This mapping may be generated with information from various sources, including information available within the data processing system, user input and/or information derived through semantic discovery. For example, a field in a physical dataset in which most entries include an "@" and a "." character may be related to a field in a logical dataset called "e-mail." This relationship may be derived through sematic discovery and used to generate the mapping. Similar relationships between fields may be specified by user input or in other ways. A mapping between the logical dataset and the physical dataset may be generated by applying these relationships. In some embodiments, information regarding unique keys and/or foreign keys specifying relationships between datasets may be used to generate the mapping.

With these relationships, a program to access the physical dataset may be configured to make any necessary mappings between fields in the physical and logical datasets. A template for a program may be selected and then configured to implement the mappings, such that both access and conversion of data formats is provided. To obtain a template, at act 806, a type of data store may be determined based on the information obtained at act 802. At act 808, a determination may be made regarding whether a program template is available for the type of data store. Many data stores may have consistent access paradigms, which may be captured in a template. Accordingly, a data processing system may store a library of templates for widely used types of data processing systems, such as an ORACLE database or a SQL Server database.

In response to a determination that a program template is available, the process proceeds to act 810 where the available program template is selected and then act 812 where a program is generated based on the selected program template. Generating the program may both enable access to the target physical dataset and applying the mapping generated in act 804 to convert between data formats of the logical dataset and the physical dataset.

At act 812, a program for accessing a physical dataset from the data store is generated. The program may be generated by populating the selected program template based on one or more first parameters at act 812*a*; and obtaining information regarding one or more other parameters at act 812*b*.

At act 812*a*, the selected program template may be populated by identifying values for first parameters of the program template based on the information obtained in act 802, such as, information automatically discovered during the registration process.

At act 812*b*, information regarding one or more other parameters of the program template may be obtained. The one or more other parameters may specify a manner in which to access the physical dataset. For example, some information may be obtained from a metadata repository maintaining metadata for the data stores. As another example, some information may be obtained via user input. For example, a user may specify information regarding type of access or security-related information. User input regarding the other parameters may be obtained during the registration process.

In some embodiments, in response to a determination that a program template is not available at act 808, the process proceeds to act 820 where a program structure to be used for generating a program is created. In some embodiments, the program structure may be created by prompting a user for input. For example, a user may provide a file containing the program structure and/or parameter values. Next, at act 822, a program for accessing a physical dataset form the data store may be generated based on the program structure as input by the user.

It will be understood that acts 802, 804, 806, 808, 810, 812, 820, and 822 may be performed for generating programs for accessing different physical datasets in a datastore or for generating programs for accessing physical datasets in different data stores, without departing from the scope of this disclosure. For example, a first program may be generated for accessing a first physical dataset in a data store and a second program may be generated for accessing a second physical dataset in the data store. As another example, a first program may be generated for accessing a first physical dataset in a first data store and a second program may be generated for accessing a second physical dataset in a second data store different from the first data store.

Once a program is generated, information to invoke execution of the program from within an application programmed in terms of a logical dataset is stored in an object of the catalog of datasets 107. The stored information may include a physical identifier of the data store or physical dataset stored in the data store, a logical identifier of the logical dataset, values of parameters to be used when the program is executed, and/or other information. In some embodiments, the object may be or include the program.

The program generated at act 812 or 822 is thus available for use from an application specifying access to a logical dataset corresponding to the physical dataset. Accordingly, at act 814, which may optionally be performed at any time after registration (or not at all), the program generated at act 812 or 822 is linked to application(s). The link enables an application programmed in terms of a logical dataset to access the physical dataset with the generated program. Upon execution of an operation to access the logical dataset, the linked program is executed to provide access to the physical dataset corresponding to the logical dataset.

Regardless of whether the generated program is linked to an application accessing a logical dataset, at act 816, a determination is made regarding whether an event indicating a change to storage of data corresponding the logical dataset is detected. For example, the change may indicate a migration from a first data store to a second data store or a change in the format of the logical dataset or a change to the format of the physical dataset. In response to detecting such an event, the process loops back to act 802, where the process may be repeated. Repeating the process may result in a new program being generated for accessing the physical dataset corresponding to a logical dataset or an existing program for accessing the physical dataset corresponding to the logical dataset being updated. However, the link to that program may be the same such that any application configured with that link for accessing the data corresponding the logical dataset will continue to operate on the correct data.

In some embodiments, in response to a determination that a change event is not detected at act 816, the process 800 continues to monitor for change events, such that the programs to access the physical datasets corresponding to the logical datasets for which access information has been generated will continue to operate as intended.

Additional Implementation Details

Figure 9:
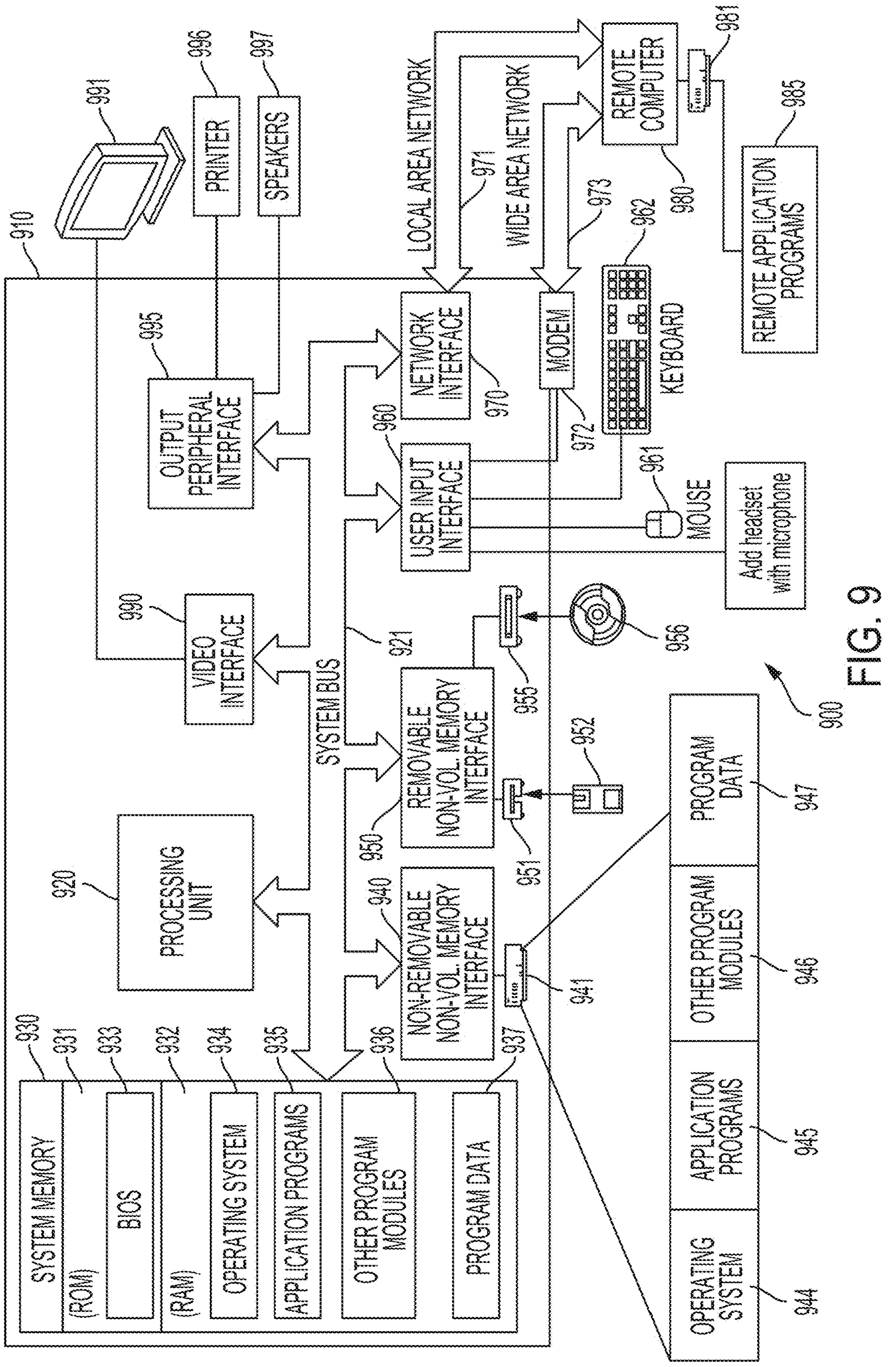
FIG. 9 is a block diagram of an illustrative computing system environment that may be used in implementing some aspects of the technology described herein.

FIG. 9 illustrates an example of a suitable computing system environment 900 on which the technology described herein may be implemented. The computing system environment 900 is only one example of a suitable computing environment and is not intended to suggest any limitation as to the scope of use or functionality of the technology described herein. Neither should the computing environment 900 be interpreted as having any dependency or requirement relating to any one or combination of components illustrated in the exemplary operating environment 900.

The technology described herein is operational with numerous other general purpose or special purpose computing system environments or configurations. Examples of well-known computing systems, environments, and/or configurations that may be suitable for use with the technology described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The technology described herein may also be practiced in distributed computing environments where tasks are performed by remote processing devices that are linked through a communications network. In a distributed computing environment, program modules may be located in both local and remote computer storage media including memory storage devices.

With reference to FIG. 9, an exemplary system for implementing the technology described herein includes a general purpose computing device in the form of a computer 900. Components of computer 910 may include, but are not limited to, a processing unit 920, a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 910 typically includes a variety of computer readable media. Computer readable media can be any available media that can be accessed by computer 910 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 910. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 930 includes computer storage media in the form of volatile and/or nonvolatile memory such as read only memory (ROM) 931 and random access memory (RAM) 932. A basic input/output system 933 (BIOS), containing the basic routines that help to transfer information between elements within computer 910, such as during start-up, is typically stored in ROM 931. RAM 932 typically contains data and/or program modules that are immediately accessible to and/or presently being operated on by processing unit 920. By way of example, and not limitation, FIG. 9 illustrates operating system 934, application programs 935, other program modules 936, and program data 937.

The computer 910 may also include other removable/non-removable, volatile/nonvolatile computer storage media. By way of example only, FIG. 9 illustrates a hard disk drive 941 that reads from or writes to non-removable, nonvolatile magnetic media, a flash drive 951 that reads from or writes to a removable, nonvolatile memory 952 such as flash memory, and an optical disk drive 955 that reads from or writes to a removable, nonvolatile optical disk 956 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 941 is typically connected to the system bus 921 through a non-removable memory interface such as interface 940, and magnetic disk drive 951 and optical disk drive 955 are typically connected to the system bus 921 by a removable memory interface, such as interface 950.

The drives and their associated computer storage media described above and illustrated in FIG. 9, provide storage of computer readable instructions, data structures, program modules and other data for the computer 910. In FIG. 9, for example, hard disk drive 941 is illustrated as storing operating system 944, application programs 945, other program modules 946, and program data 947. Note that these components can either be the same as or different from operating system 934, application programs 935, other program modules 936, and program data 937. Operating system 944, application programs 945, other program modules 946, and program data 947 are given different numbers here to illustrate that, at a minimum, they are different copies. An actor may enter commands and information into the computer 910 through input devices such as a keyboard 962 and pointing device 961, commonly referred to as a mouse, trackball or touch pad. Other input devices (not shown) may include a microphone, joystick, game pad, satellite dish, scanner, or the like. These and other input devices are often connected to the processing unit 920 through a user input interface 960 that is coupled to the system bus, but may be connected by other interface and bus structures, such as a parallel port, game port or a universal serial bus (USB). A monitor 991 or other type of display device is also connected to the system bus 921 via an interface, such as a video interface 990. In addition to the monitor, computers may also include other peripheral output devices such as speakers 997 and printer 996, which may be connected through an output peripheral interface 995.

The computer 910 may operate in a networked environment using logical connections to one or more remote computers, such as a remote computer 980. The remote computer 980 may be a personal computer, a server, a router, a network PC, a peer device or other common network node, and typically includes many or all of the elements described above relative to the computer 910, although only a memory storage device 981 has been illustrated in FIG. 9. The logical connections depicted in FIG. 9 include a local area network (LAN) 971 and a wide area network (WAN) 973, but may also include other networks. Such networking environments are commonplace in offices, enterprise-wide computer networks, intranets and the Internet.

When used in a LAN networking environment, the computer 910 is connected to the LAN 971 through a network interface or adapter 970. When used in a WAN networking environment, the computer 910 typically includes a modem 972 or other means for establishing communications over the WAN 973, such as the Internet. The modem 972, which may be internal or external, may be connected to the system bus 921 via the actor input interface 960, or other appropriate mechanism. In a networked environment, program modules depicted relative to the computer 910, or portions thereof, may be stored in the remote memory storage device. By way of example, and not limitation, FIG. 9 illustrates remote application programs 985 as residing on memory device 981. It will be appreciated that the network connections shown are exemplary and other means of establishing a communications link between the computers may be used.

The techniques described herein may be implemented in any of numerous ways, as the techniques are not limited to any particular manner of implementation. Examples of details of implementation are provided herein solely for illustrative purposes. Furthermore, the techniques disclosed herein may be used individually or in any suitable combination, as aspects of the technology described herein are not limited to the use of any particular technique or combination of techniques.

Having thus described several aspects of the technology described herein, it is to be appreciated that various alterations, modifications, and improvements are possible.

For example, it is described that a user writes applications that specify access to logical data. In some embodiments, the user may be a human user. In other embodiments, the user may be a program with artificial intelligence (an AI). The AI, for example, may derive data processing algorithms by processing a data set which may then be applied to other datasets.

As another example, information 702, 704, and 706 is depicted as being maintained in separate tables. However, the information may be maintained in one table or combined in any data structure in any suitable way.

Such alterations, modifications, and improvements are intended to be part of this disclosure, and are intended to be within the spirit and scope of disclosure. Further, though advantages of the technology described herein are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

The above-described aspects of the technology described herein can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. However, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, aspects of the technology described herein may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments described above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the technology as described above. As used herein, the term "computer-readable storage medium" encompasses only a non-transitory computer-readable medium that can be considered to be a manufacture (i.e., article of manufacture) or a machine. Alternatively or additionally, aspects of the technology described herein may be embodied as a computer readable medium other than a computer-readable storage medium, such as a propagating signal.

The terms "program" or "software" are used herein in a generic sense to refer to any type of computer code or set of computer-executable instructions or processor-executable instructions that can be employed to program a computer or other processor to implement various aspects of the technology as described above. Additionally, it should be appreciated that according to one aspect of this embodiment, one or more computer programs that when executed perform methods of the technology described herein need not reside on a single computer or processor, but may be distributed in a modular fashion amongst a number of different computers or processors to implement various aspects of the technology described herein.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the technology described herein may be used alone, in combination, or in a variety of arrangements not specifically described in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the technology described herein may be embodied as a method, of which examples are provided herein including with reference to FIG. 8. The acts performed as part of any of the methods may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by an "actor" or a "user". It should be appreciated that an "actor" or a "user" need not be a single individual, and that in some embodiments, actions attributable to an "actor" or a "user" may be performed by a team of individuals and/or an individual in combination with computer-assisted tools or other mechanisms.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method for configuring a data processing system to facilitate access to a plurality of physical datasets in data stores, wherein the data processing system comprises a dataset multiplexer, the method comprising:

configuring the dataset multiplexer of the data processing system to provide an application with access to a physical dataset of the plurality of physical datasets at least in part by:

receiving information relating to a first physical dataset of the plurality of physical datasets stored in a first data store of a plurality of data stores, wherein the first physical dataset corresponds to a first logical dataset;

generating, based on the information relating to the first physical dataset, a first program comprising computer-executable instructions for accessing the first physical dataset from the first data store, wherein generating the first program comprises:

identifying a type of the first data store from the information relating to the first physical dataset;

selecting a first program template for the type of the first data store; and populating the first program template with one or more values for one or more parameters of the first program template to generate the first program;

storing, in a first object in a library of objects, a link to the first program to enable the application to access the first physical dataset with the first program; and updating the first object in the library of objects in response to events indicating changes in the first physical dataset associated with the first logical dataset, wherein updating the first object comprises updating the first program comprising computer-executable instructions for accessing the first physical dataset.

2. The method of claim 1, wherein the method further comprises:

based on detecting an event indicating a change associated with the first physical dataset, determining whether to modify the first program for accessing the first physical dataset.

3. The method of claim 2, wherein the method further comprises, based on determining to modify the first program:

generating a modified first program by updating the first program comprising the computer-executable instructions for accessing the first physical dataset; and replacing the first program with the modified first program as a target of the link.

4. The method of claim 3, wherein generating the modified first program comprises generating the modified first program without modifying the application or the first logical dataset.

5. The method of claim 1, wherein:

the dataset multiplexer comprises the library of objects storing information for access to the plurality of physical datasets, and the first object in the library of objects comprises an identifier of the first physical dataset.

6. The method of claim 5, wherein:

the dataset multiplexer further comprises an API and the method further comprises providing the application access to the first object through the API.

7. The method of claim 5, wherein:

the identifier of the first physical dataset is a physical identifier.

8. The method of claim 7, wherein:

the first object further comprises a second identifier, and the second identifier is a logical identifier of a logical dataset associated with the first object.

9. The method of claim 8, wherein the method further comprises:

in response to detecting an event indicating that the first physical dataset has changed from being stored in the first data store to being stored in a second data store, modifying in the first object the physical identifier without modifying the logical identifier.

10. The method of claim 5, wherein:

the first object comprises values of parameters accessed in execution of the first program; and the method further comprises:

based on detecting an event indicating a change to values of parameters accessed in the first program, modifying values of the parameters stored in the first object.

11. The method of claim 10, wherein the application is configured to supply a value of the parameters for use in invoking the first program.

12. The method of claim 1, wherein the first program comprises access and conversion logic, and upon execution of the application, the access and conversion logic of the first program is executed to provide access to the first physical dataset and convert between a format used within the first physical dataset and a format used within the first logical dataset.

13. The method of claim 1, wherein the first program is configured as an executable data flow graph comprising logic for accessing the first physical dataset.

14. A data processing system comprising:

at least one computer hardware processor; and at least one non-transitory computer-readable storage medium storing instructions that, when executed by the at least one computer hardware processor, cause the data processing system to perform a method comprising:

configuring a dataset multiplexer of the data processing system to provide an application with access to a physical dataset of a plurality of physical datasets at least in part by:

receiving information relating to a first physical dataset of the plurality of physical datasets stored in a first data store of a plurality of data stores, wherein the first physical dataset corresponds to a first logical dataset;

generating, based on the information relating to the first physical dataset, a first program comprising computer-executable instructions for accessing the first physical dataset from the first data store;

storing, in a first object in a library of objects, a link to the first program to enable the application to access the first physical dataset with the first program; and updating the first object in the library of objects in response to events indicating changes in the first physical dataset associated with the first logical dataset, wherein updating the first object comprises updating the first program comprising computer-executable instructions for accessing the first physical dataset.

15. The data processing system of claim 14, wherein the method further comprises:

based on detecting an event indicating a change associated with the first physical dataset, determining whether to modify the first program for accessing the first physical dataset.

16. The data processing system of claim 15, wherein the method further comprises, based on determining to modify the first program:

generating a modified first program by updating the first program comprising the computer-executable instructions for accessing the first physical dataset; and replacing the first program with the modified first program as a target of the link.

17. The data processing system of claim 16, wherein generating the modified first program comprises generating the modified first program without modifying the application or the first logical dataset.

18. The data processing system of claim 14, wherein:

the dataset multiplexer comprises the library of objects storing information for access to the plurality of physical datasets, and the first object in the library of objects comprises an identifier of the first physical dataset, wherein the identifier of the first physical dataset is a physical identifier.

19. The data processing system of claim 18, wherein:

the dataset multiplexer further comprises an API and the method further comprises providing the application access to the first object through the API.

20. The data processing system of claim 18, wherein:

the first object further comprises a second identifier, and the second identifier is a logical identifier of a logical dataset associated with the first object.

21. The data processing system of claim 20, wherein the method further comprises:

in response to detecting an event indicating that the first physical dataset has changed from being stored in the first data store to being stored in a second data store, modifying in the first object the physical identifier without modifying the logical identifier.

22. The data processing system of claim 14, wherein:

the first object comprises values of parameters accessed in execution of the first program; and the method further comprises:

based on detecting an event indicating a change to values of parameters accessed in the first program, modifying values of the parameters stored in the first object.

23. The data processing system of claim 14, wherein the first program comprises access and conversion logic, and upon execution of the application, the access and conversion logic of the first program is executed to provide access to the first physical dataset and convert between a format used within the first physical dataset and a format used within the first logical dataset.

24. The data processing system of claim 14, wherein the first program is configured as an executable data flow graph comprising logic for accessing the first physical dataset.

25. At least one non-transitory computer-readable storage medium storing instructions that, when executed by at least one computer hardware processor, cause the at least one computer hardware processor to perform a method for configuring a data processing system to facilitate access to a plurality of physical datasets in data stores, wherein the data processing system comprises a dataset multiplexer, the method comprising:

configuring the dataset multiplexer of the data processing system to provide an application with access to a physical dataset of the plurality of physical datasets at least in part by:

receiving information relating to a first physical dataset of the plurality of physical datasets stored in a first data store of a plurality of data stores, wherein the first physical dataset corresponds to a first logical dataset;

generating, based on the information relating to the first physical dataset, a first program comprising computer-executable instructions for accessing the first physical dataset from the first data store, wherein generating the first program comprises:

generating a mapping between one or more fields of the first physical dataset and one or more fields of the first logical dataset that represent the same information; and generating, using the mapping, conversion logic configured to convert between a format of the first physical dataset and a format of the first logical dataset;

storing, in a first object in a library of objects, a link to the first program to enable the application to access the first physical dataset with the first program.

* * * * *